United States Patent [19]
Matsumura et al.

[11] Patent Number: 5,040,006
[45] Date of Patent: Aug. 13, 1991

[54] CAMERA

[75] Inventors: Koichi Matsumura; Akira Yoshihara, both of Kanagawa, Japan

[73] Assignee: Canon Kabushiki Kaisha, Tokyo, Japan

[21] Appl. No.: 583,004

[22] Filed: Sep. 17, 1990

Related U.S. Application Data

[63] Continuation of Ser. No. 186,110, Apr. 25, 1988, abandoned.

[30] Foreign Application Priority Data

| Apr. 27, 1987 | [JP] | Japan | 62-102013 |
| Apr. 27, 1987 | [JP] | Japan | 62-102014 |
| Apr. 27, 1987 | [JP] | Japan | 62-102015 |
| Apr. 27, 1987 | [JP] | Japan | 62-102016 |
| Apr. 27, 1987 | [JP] | Japan | 62-102017 |
| Apr. 27, 1987 | [JP] | Japan | 62-102018 |
| Jul. 3, 1987 | [JP] | Japan | 62-167536 |
| Jul. 3, 1987 | [JP] | Japan | 62-167537 |
| Jul. 3, 1987 | [JP] | Japan | 62-167538 |
| Nov. 27, 1987 | [JP] | Japan | 62-299018 |
| Feb. 10, 1988 | [JP] | Japan | 63-027685 |
| Feb. 10, 1988 | [JP] | Japan | 63-027686 |

[51] Int. Cl.⁵ .................... G03B 17/24; G03B 17/40
[52] U.S. Cl. .................... 354/106; 354/238.1; 354/267.1; 354/289.12
[58] Field of Search .................... 354/106, 237, 238.1, 354/267.1, 289.12

[56] References Cited

U.S. PATENT DOCUMENTS

| 4,466,721 | 8/1984 | Detuzzi | 354/267.1 |
| 4,678,304 | 7/1987 | Kazumi | 354/267.1 X |
| 4,699,487 | 10/1987 | Kawamura et al. | 354/238.1 X |

Primary Examiner—Michael L. Gellner
Attorney, Agent, or Firm—Fitzpatrick, Cella, Harper & Scinto

[57] ABSTRACT

An interval shootable camera is designed in system configuration so that an interval time counting operation for interval shooting is disabled when a shutter of the camera is released during the time counting operation, that a self-timer time is used as an interval time, if the interval shooting operation is started up with the interval time not set, that the interval time is created by interlocking a time counting operation of the first timer for the interval shooting with a time counting operation of the second timer for self-timer shooting, that the interval timer to be set is displayed in hour and minute digits at first on setting the interval time, while the counting status of the interval time set is displayed in the second digit as well as the hour and minute digits after the counting operation of the set interval time starts, that the counting operation of the set interval time is not started when a main switch of the camera is set to OFF, and that if data imprinting is effected, the counting status of the set interval time continues to be displayed just before the interval shooting is started.

32 Claims, 30 Drawing Sheets

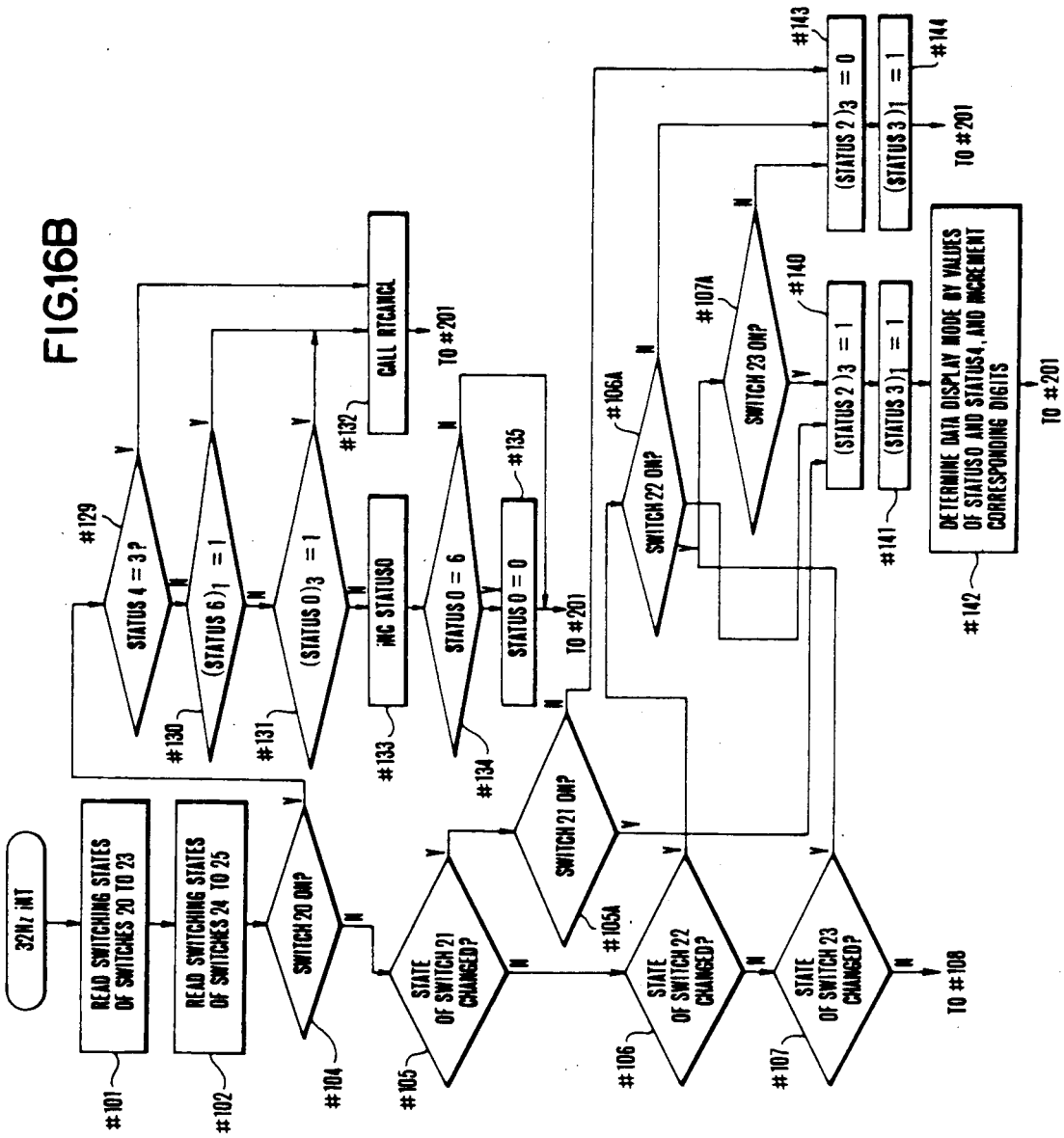

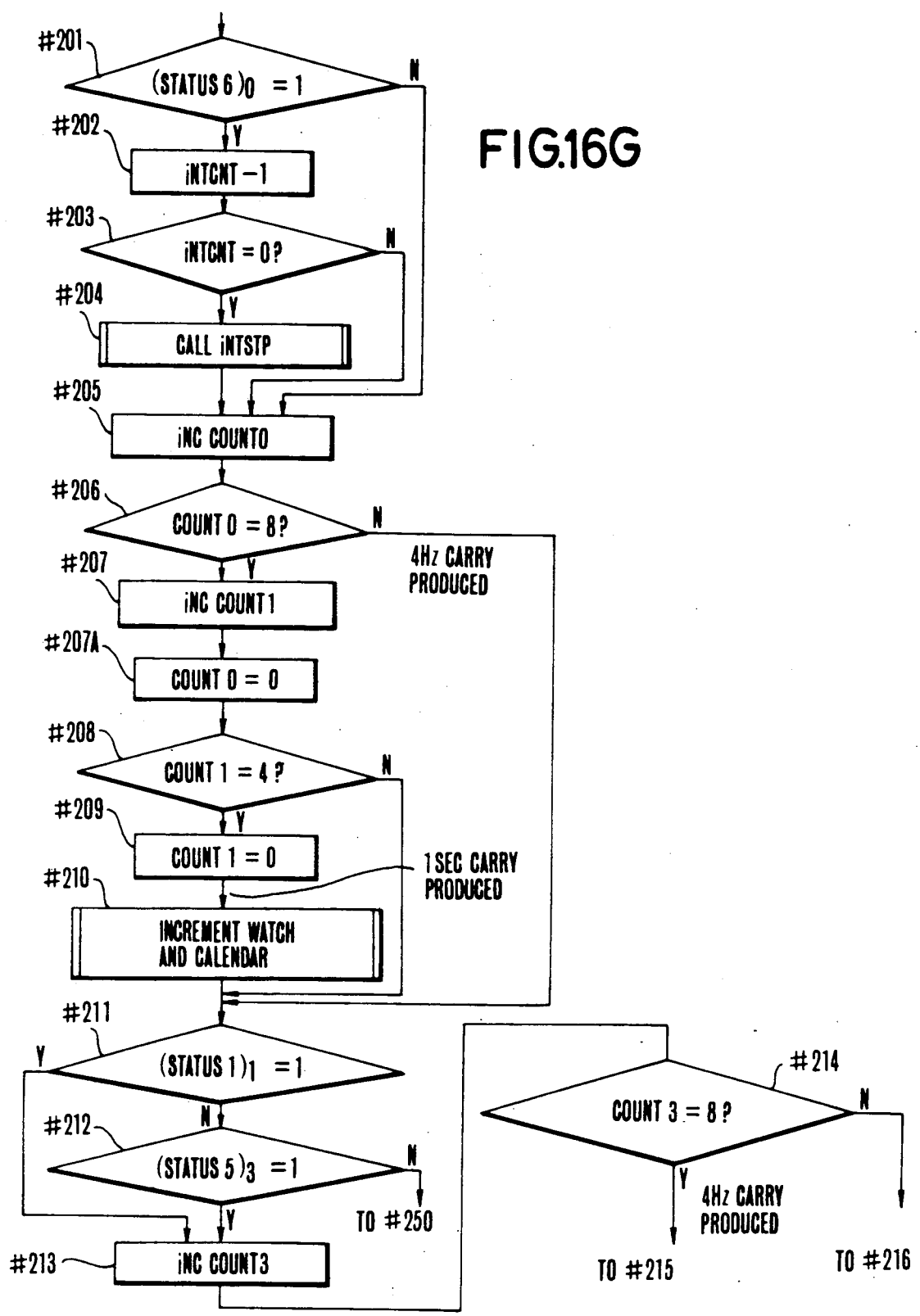

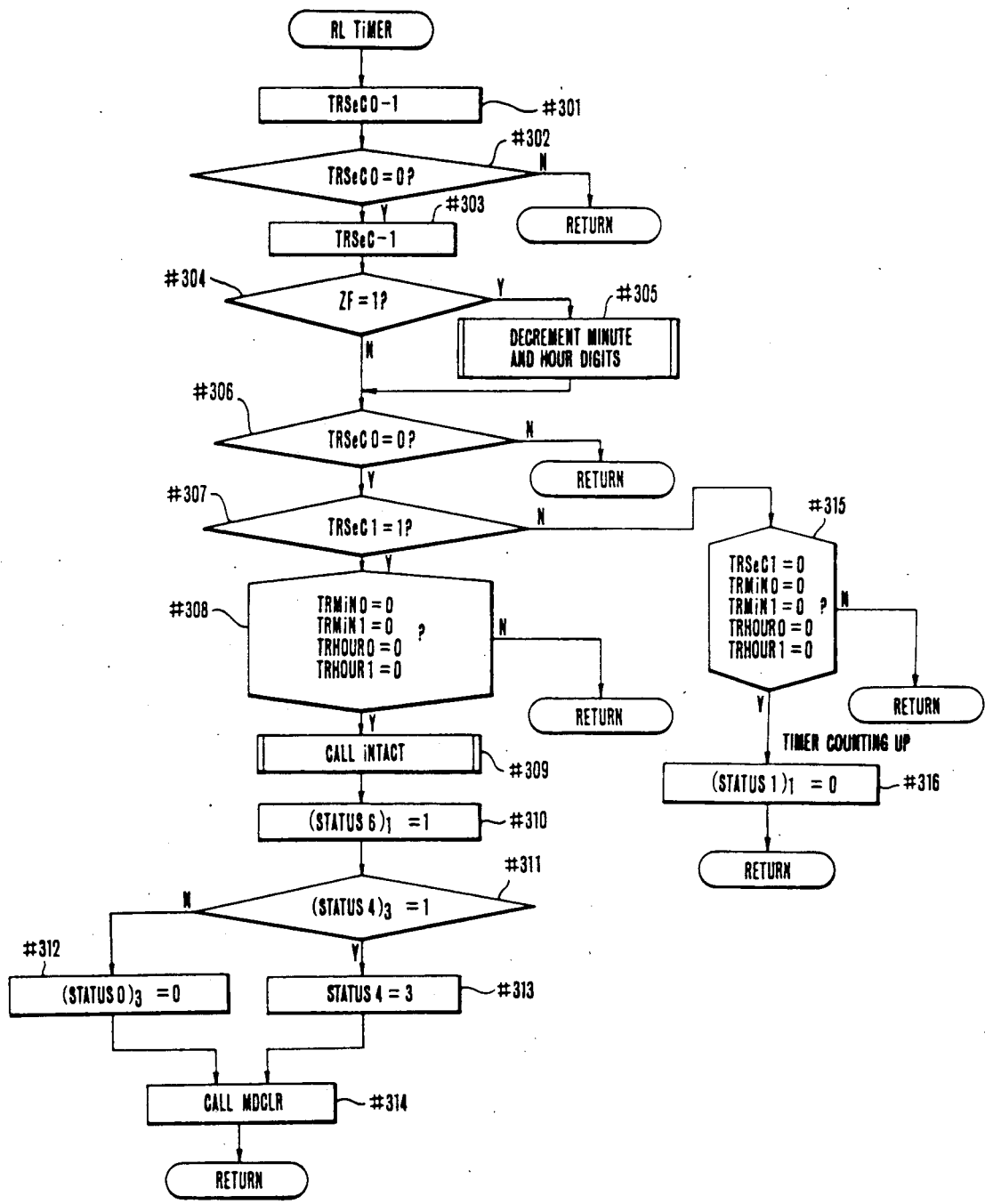

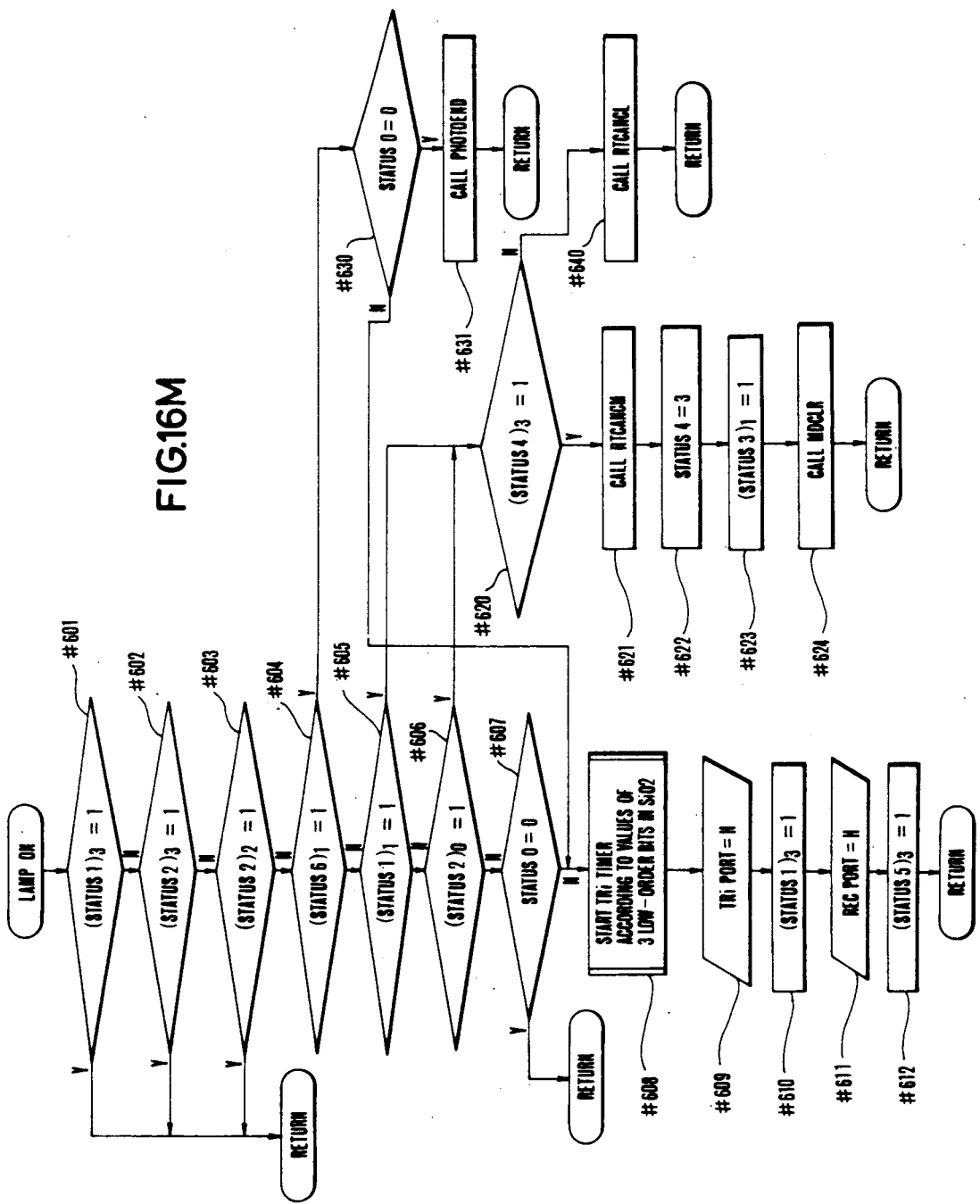

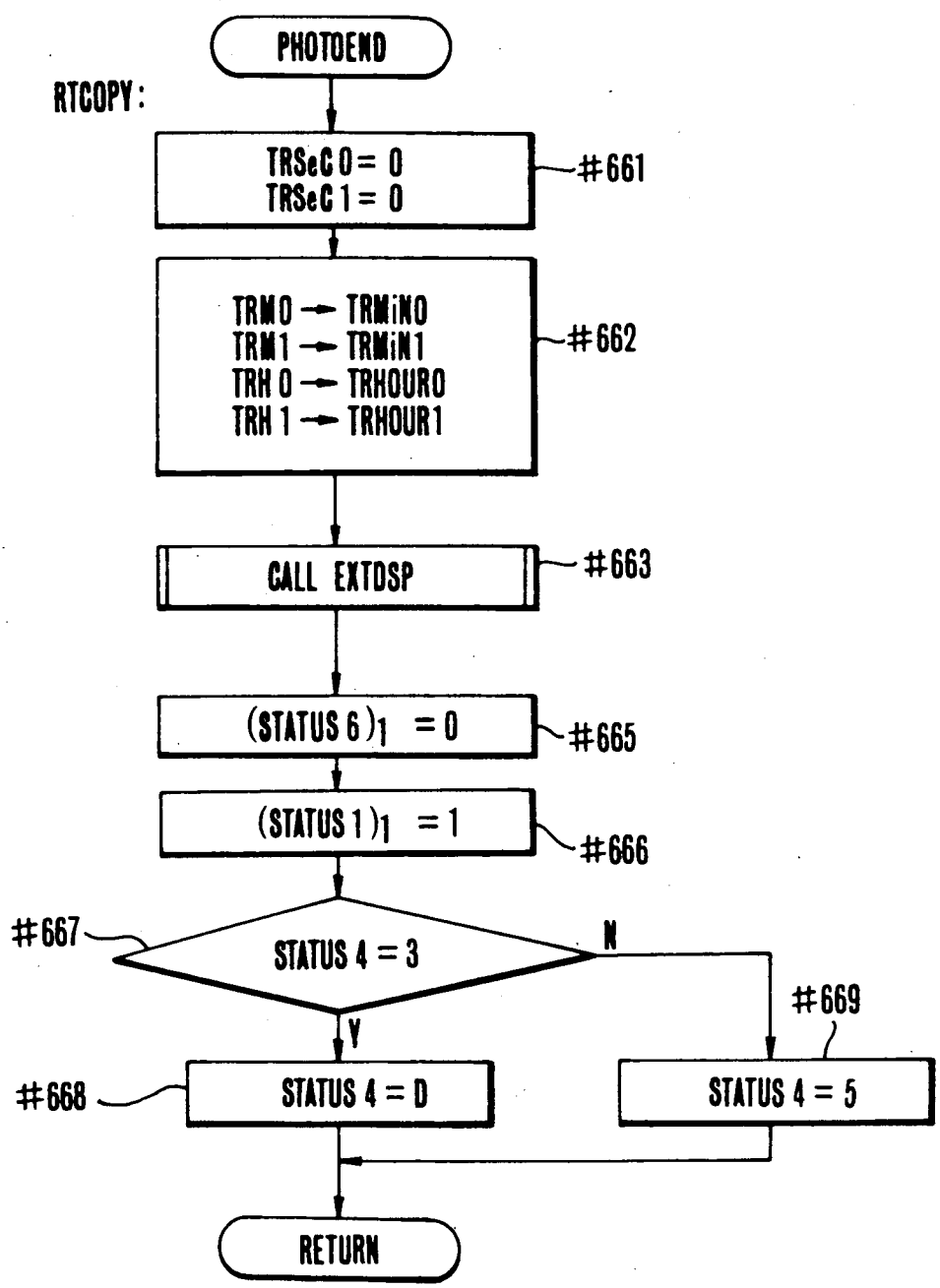

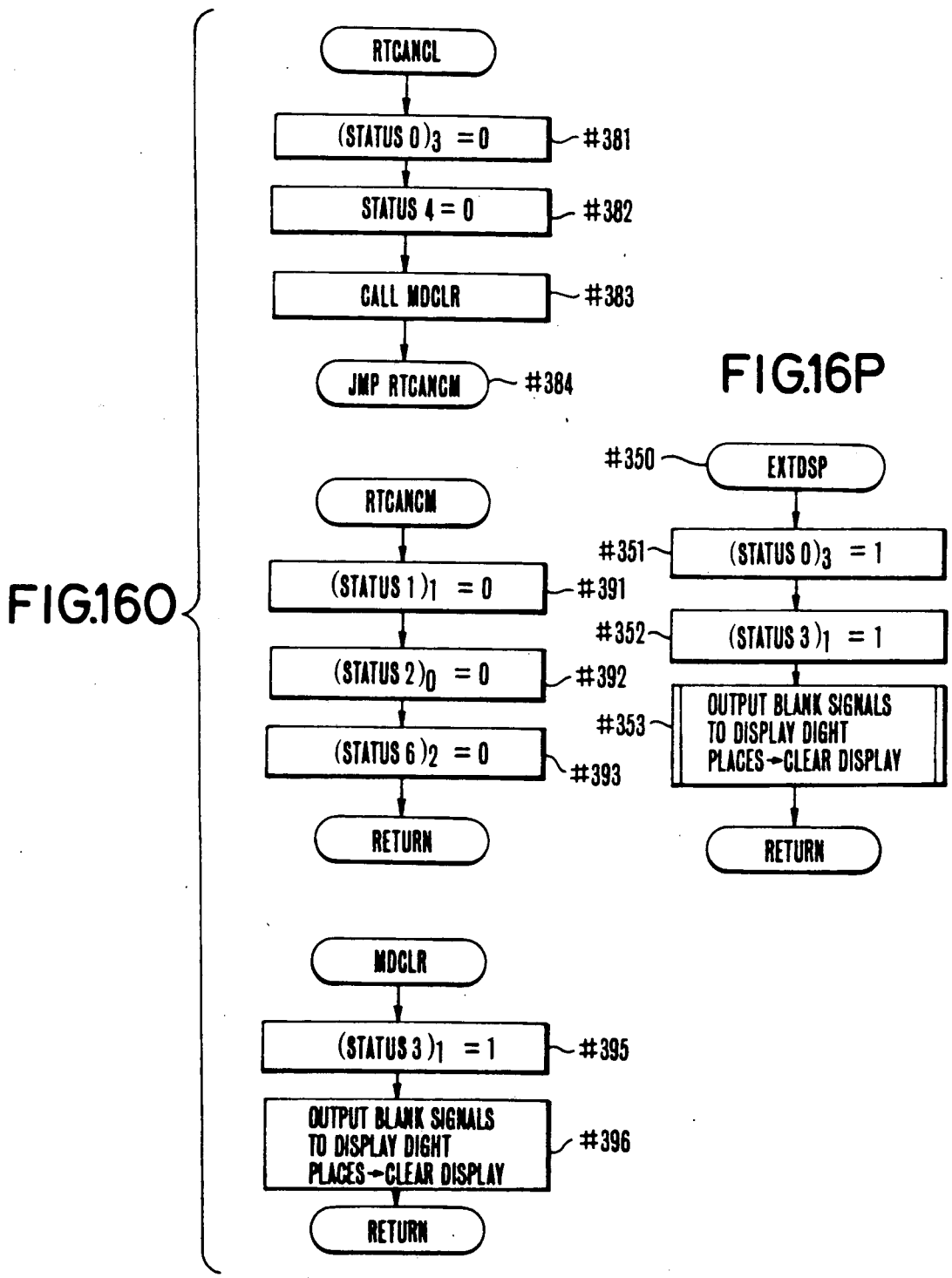

FIG.20

| MEMORY ADDRESS LABEL | CONTENTS | PORT ADDRESS | INPUT/ OUTPUT |
|---|---|---|---|
| Y | CURRENT DATE YEAR DIGITS | Y0 ~ Y5 | I |
| M | CURRENT DATE MONTH DIGITS | M0 ~ M3 | I |
| D | CURRENT DATE DAY DIGITS | D0 ~ D4 | I |
| SY | REFERENCE DATE YEAR DIGITS | SY0 ~ SY5 | I |
| SM | REFERENCE DATE MONTH DIGITS | SM0 ~ SM3 | I |
| SD | REFERENCE DATE DAY DIGITS | SD0 ~ SD4 | I |
| PY | DIGITS OF PASSED YEARS | PY0 ~ PY5 | — |
| PM | DIGITS OF PASSED MONTHS | PM0 ~ PM3 | — |
| PD | DIGITS OF PASSED DAYS | PD0 ~ PD4 | — |
| PH | HIGH-ORDER DIGITS OF TIME LAPSE DATA | PH0 ~ PH5 | O |
| PL | LOW-ORDER DIGITS OF TIME LAPSE DATA | PL0 ~ PL4 | O |
| DM | THE NUMBER OF DAYS IN THE REFERENCE MONTH | DM0 ~ PM4 | I |
| YM/MD CTRL | YEAR-MONTH/MONTH-DAY DISPLAY SWITCHING | YM/MD. CTRL | O |
| WARN | WARNING DISPLAY CONTROL | WARN | O |

FIG.21

| DM OUTPUT | MONTHS CONCERNED |
|---|---|
| 31 | 1, 3, 5, 7, 8, 10, 12, |
| 30 | 4, 6, 9, 11 |
| 29 | 2 (IN LEAP-YEAR) |
| 28 | 2 (IN NON-LEAP-YEAR) |

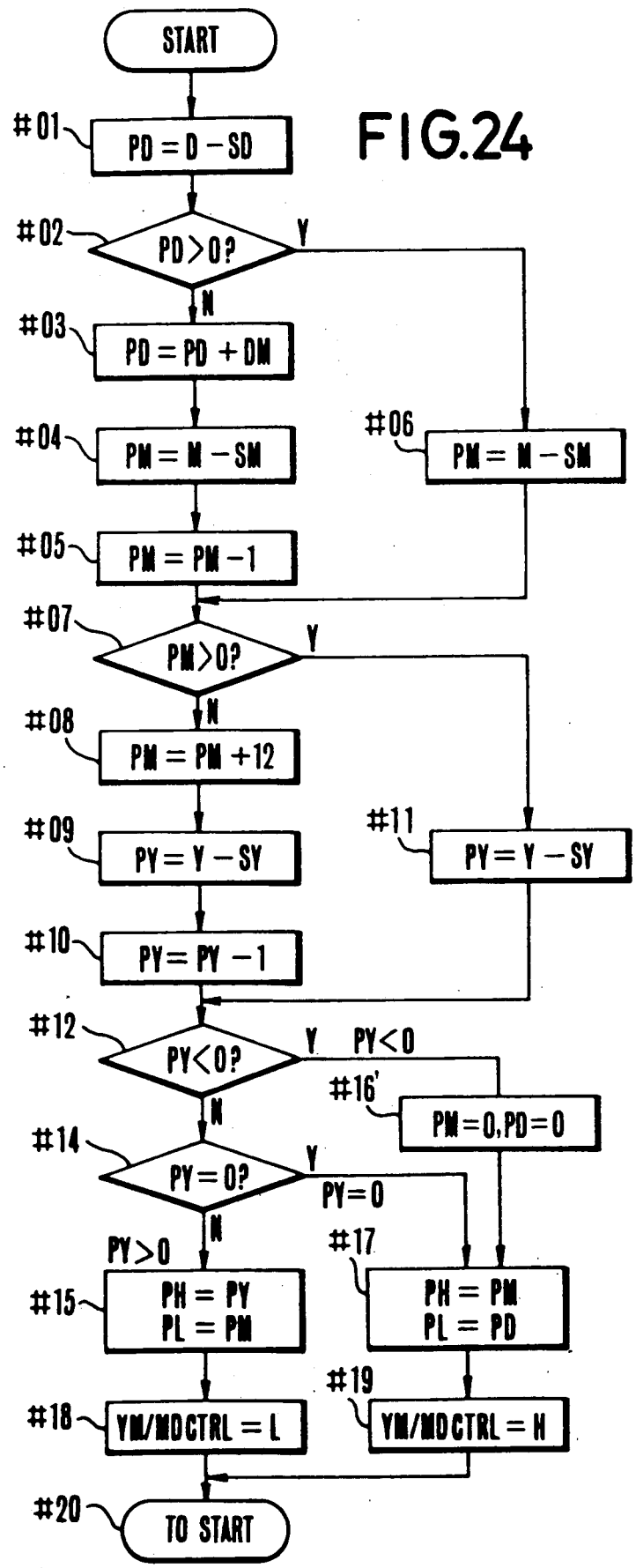

CAMERA

This application is a continuation of application Ser. No. 07/186,110 filed Apr. 25, 1988, now abandoned.

BACKGROUND OF THE INVENTION

1. Field of the Invention

The present invention relates to an interval shootable camera, particularly to improvements made in such a camera.

2. Description of the Related Art

Conventionally, a variety of so called interval shootable cameras, which can take pictures at fixed intervals, have been proposed. However, these cameras have presented inconveniences as follows:

First conventional interval shootable cameras comprise an interval shooting timer which is not designed to stop its operation when the shutter release on the camera body is operated during its operation.

Such a timer would be sufficient, if the photographer desired to continue photographing by using the timer after having released the shutter. If he did not desire to do so and failed to stop the timer, however, the interval timer would continue to operate for photographing, contrary to his intention.

Second, conventional timers for cameras are so designed that they will not start the operation if they are reset, that is, set to zero in interval time. Consequently, there would be no photographing operation, if the photographer who intended to take pictures by using the interval timer failed to set the interval time. Besides, cameras comprising an interval timer that can be set only in minutes cannot take pictures at intervals of less than one minute using the interval timer.

Third, conventional interval timers for cameras are designed so as to transmit release signals to their individual cameras each time when the preset times are counted up. For compact cameras equipped with an electronic flash device which can flash automatically in the dark, the interval timers would have to latch the release signals until the cameras have completed charging of the flash devices, before they released the shutters in dark environments of photography. These timers and cameras would encounter an inconvenience that the transfer of release signal is complicated between them.

Fourth, the interval timers in the interval shooting systems for conventional cameras are designed so that interval time setting is possible in hours, minutes and seconds. However, there have been a few situations where time setting in seconds was required to operate the interval shooting system. In addition, the switching and other operations are complicated for time setting.

Fifth, the interval timers for conventional cameras with backcover data imprinting devices are designed so that they can be set in interval time and start counting while the main switches on the camera bodies are set to OFF. However, the camera would not start shooting with its main switch set to OFF.

If the photographer failed to turn on the main switch of his camera and started the interval timer, he would find that his camera had taken no picture.

Sixth, if one display unit was used both as a data monitor unit and an interval timer setting display unit in a camera with a data imprinting device, the display would be switched to the data imprinting information when the interval timer was started to count the set interval time, while the timer operation was displayed, for example, with a small flashing dot at a corner of the display screen. However, the timer operation could not be easily viewed at a glance with the small flashing dot.

SUMMARY OF THE INVENTION

The first object of the present invention is to provide a camera comprising an interval timer circuit which can deliver a release signal at the preset period of time to release the shutter of the camera, wherein the subtracting operation of the interval timer circuit can be stopped when the shutter is released by pressing the shutter release button on the camera body during the subtracting operation.

According to the present invention, therefore, the counting operation of the interval timer can be stopped with the interval timer mode turned off, and the shutter can be released in normal photography mode, if the photographer releases the shutter by pressing the shutter release button on the camera body during the operation of the interval timer circuit in order to take a picture in normal mode, that is, in non-interval timer mode. Thus, it can be avoided that the camera would continue to operate in interval shooting mode wastefully and contrary to the photograher's intention.

The second object of the present invention is to provide a camera comprising an interval timer circuit which is designed to release the shutter of the camera at intervals of time arbitrarily preset by first operating means and a self-timer circuit which is designed to release the shutter a preset self-timer time after the operation by second operating means was started, wherein the interval time is equal to the preset self-timer time if the interval timer is started up with no interval time set by the first operating means.

According to the present invention, therfore, interval shooting is possible at intervals of time equal to the self-timer time preset by the operated self-timer circuit, if the shutter is released with the interval time not set, that is, set to 0 in interval shooting mode. It is also possible at intervals of less than 1 minute.

The third object of the present invention is to provide a camera comprising the first timer circuit (self-timer circuit in the camera body) which is designed to deliver a shutter release signal the preset time after the startup operation was started, and the second timer circuit (interval timer circuit) which is designed to deliver a shutter release signal any arbitrarily settable time after the startup operation was started, wherein the second timer circuit is designed to deliver a signal for starting up the first timer circuit when the time is counted up which is equal to the preset operating time of the second timer circuit minus the preset operating time of the first timer circuit.

According to the present invention, therefore, the shutter release can be operated by the operation of the self-timer facility in interval shooting mode. In case of operating an electronic flash device for automatic flashing in a low-illumination environment, another circuit that keeps the shutter release signal latched until the flashing device is completely charged is not required, because a sequence circuit in the self-timer facility is used in common. Thus, the configuration of the circuitry is simplified, and at the same time, photography is facilitated both in using natural and artificial lights.

The fourth object of the present invention is to provide an interval shooting system which can release the shutter of a camera with a release signal delivered by an interval timer circuit at the preset period of time, and which permits an external display unit to indicate the time in hours and minutes at the timer setting time and the time in hours, minutes and seconds after the timer starts to count.

According to the present invention, therefore, the switching operations are simplified for setting the interval timer time, because the timer time for interval shooting is set in hours and minutes at first and displayed in hours, minutes and seconds after the timer is started. Besides, the timer operation can be easily and clearly viewed on the display unit, because the time in seconds is, for example, counted down during the timer operation.

The fifth object of the present invention is to provide a camera comprising first switching means for controlling all the facilities of the camera concentratedly, interval shooting means for providing a shutter release operation with a shutter release signal delivered by an interval timer circuit at the preset period of time, second switching means for starting the interval shooting means, and a display unit for displaying mainly the time from the startup of the second switching means to that of the shutter release, wherein the interval shooting means is not operated by the second switching means while the first switching means is set to OFF.

According to the present invention, therefore, if the first switching means is set to ON with the second switching means set to ON in interval shooting mode, the interval shooting means is operated with the interval timer time displayed, for example, in countdown on the display unit. If the first switching means is set to OFF, the interval shooting means is not started up with the display unit providing no countdown indication, which informs that the first switching means is set to OFF. Thus, a failure can be prevented that the camera takes no photo because of the photographer's error in camera operation.

The sixth object of the present invention is to provide a camera equipped with a data imprinting device and comprising an interval timer circuit which can deliver a shutter release signal at the preset period of time to release the shutter, wherein a display unit provided on the outer surface of the camera can indicate the required imprinting data or the data of sequentially changing interval timer operation selectively, so that in interval shooting mode, the display unit can present the timer operation, for example, in countdown during the operation of the timer started by releasing, while the unit can switch the display to the data imprinting information at the preset time, for example, 10 seconds before the timer starts counting up to deliver a release signal with which the shutter is released.

According to the present invention, therefore, the timer operation can be clearly viewed, because the display unit switches the display from the data imprinting information to the timer operation when the timer is operated. In addition, the required time to change the display of a photoelectric device such as LCD (liquid crystal display) can be covered at low temperatures to assure the positive data imprinting operation upon shutter releasing, because the display is switched to the data imprinting information the predetermined time before the timer starts counting up.

The other objects and features of the present invention will be understood by reading the description of several embodiments, not limitative, according to the present invention with reference to the drawings annexed hereto.

BRIEF DESCRIPTION OF THE DRAWINGS

FIG. 20 is a table listing the inputs and outputs of the I/0 ports on the central processing unit (CPU) in the calculator as shown in FIG. 19.

FIG. 21 is a table listing the outputs from the "end of month" correcting circuit 116 in the calculator as shown in FIG. 19.

FIG. 24 is a flowchart showing a partial modification of the flowchart as shown in FIG. 22.

DETAILED DESCRIPTION OF THE PREFERRED EMBODIMENTS

A preferred embodiment of the system according to the present invention will be described below with reference to FIGS. 1 to 18C.

Figure 3:
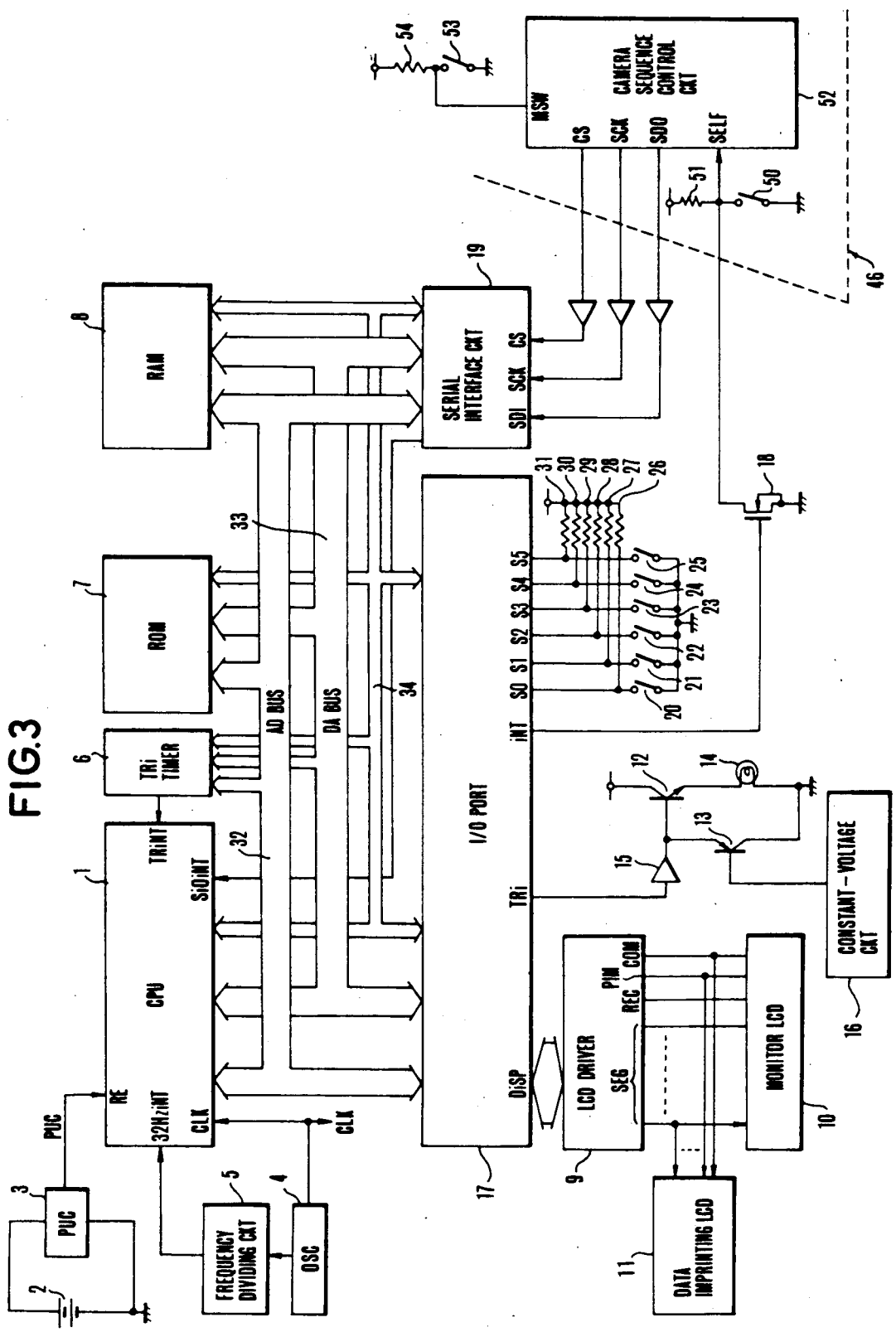
FIG. 3 is a block diagram showing the electronic control circuit of the camera.
Figure 4:
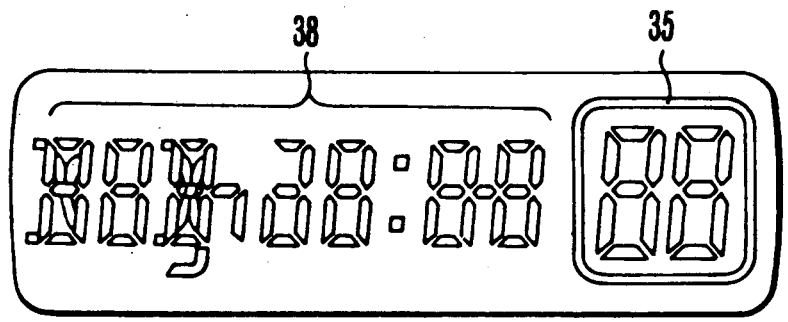
FIG. 4 is a layout of monitor LCD segments.
Figure 5:
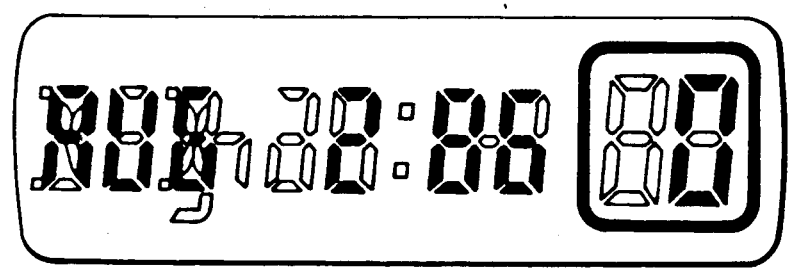
FIGS. 5 to 14 are views illustrating the displays of monitors LCDs respectively.
Figure 6:
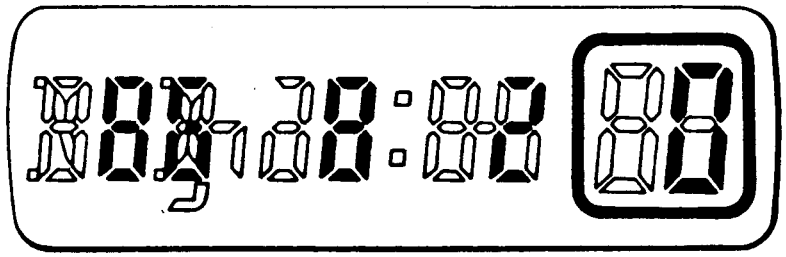
Figure 7:
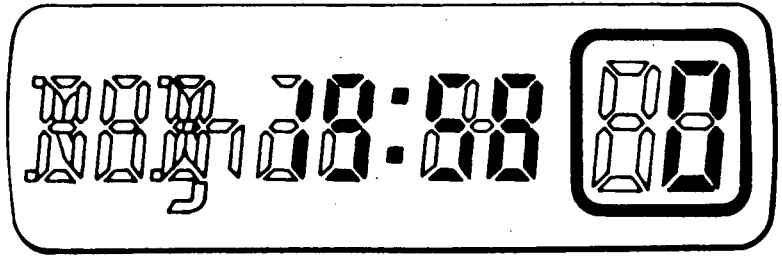
Figure 8:
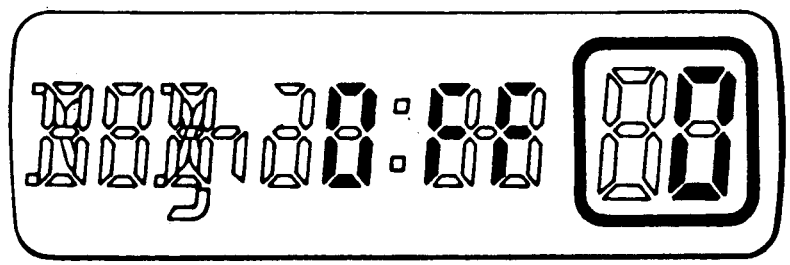

FIG. 3 is a block diagram showing the circuit configuration of a data imprinting device with an interval timer facility.

In this figure, the part on the right side relative to the disconnecting line shows a control circuit contained in the camera body 46. Reference numeral 1 is a central processing unit (hereinafter referred to as CPU) in a microcomputer which provides the sequence control for the operation of the entire system according to the present invention as well as the change and time counting of a watch and calendar and the control of the timers. The Reference numeral 3 is a PUC circuit which delivers a powerup clear signal when a battery 2 of the camera is switched on. When this signal enters the RESET (RE) terminal of the CPU 1, the CPU 1 is reset. Reference numeral 4 is an oscillator which generates reference clock pulses (CLKs). When this signal enters the input terminal CLK in the CPU 1, all the operations of circuits in this system are synchronized. Reference numeral 5 is a frequency dividing circuit which divides the frequency of the CLK pulse into 32 Hz in this embodiment, which enters the 32 HziNT terminal of the CPU 1. Reference numeral 6 is a TRi timer which counts the lighting time of a data imprinting lamp 14. When the count reaches zero (0), the TRi timer 6 enters an interrupt signal TRiNT into the CPU 1. Reference numeral 7 is a ROM which stores the contents of a program. Reference numeral 8 is a RAM which reads out and writes in data.

Reference numeral 10 is a monitor LCD. Reference numeral 11 is a data imprinting LCD. The two LCDs are mounted inside the back cover 45 of the camera, and display the data imprinting information, the operation of the interval timer, the data imprinting recognition (REC) mark 37, the photographing information (PIM) mark 36, etc. with the signals from the segment (SEG) terminals, common (COM) terminal, REC terminal and PIM terminal on an LCD driver 9.

A data imprinting circuit is connected to the base of a transistor 12 and the emitter of a transistor 13 through a buffer 15 connected to the TRi terminal of an I/O port 17, the two transistors 12 and 13 being used to drive the data imprinting lamp 14. The transistor 12 comprises a collector connected to the positive pole of a power battery and an emitter connected to one of the terminals on the data imprinting lamp 14. The transistor 13 comprises a base connected to the output terminal of a constant-voltage circuit 16 to drive the lamp 14 with the constant voltage, and an emitter grounded together with the other terminal of the lamp 14.

An N-channel MOS transistor 18 is connected to the iNT terminal of the I/O port 17. This MOS transistor 18, turned on, can apply a low level to the SELF terminal of a camera sequence control circuit 52 as a self-timer switch 50 on the camera body 46 is set to ON. When the MOS transistor 18 and the self-timer switch 50 are set to OFF, the SELF terminal is pulled up by a pull-up resistor 51 to a high level.

Reference numeral 19 is a serial interface circuit which receives information from the camera body 46. The chip select (CS) terminal, serial clock (SCK) terminal and serial data input (SDI) terminal of the serial interface circuit 19 are connected separately to the camera sequence control circuit 52. The serial interface circuit 19 is also connected to the SiOiNT terminal of the CPU 1 to deliver an interrrupt signal to the CPU 1 with a serial code entered in the circuit 19.

On the I/O port 17, terminals S0, S1, S2, S3, S4 and S5 are connected to a data imprinting mode selector switch 20, imprinting data and interval timer time modifying switches 21, 22 and 23, a time lapse imprinting mode selector switch 24 and an interval timer mode switch 25, respectively, and also connected to pull-up resistors 26, 27, 28, 29, 30 and 31, respectively, to be pulled up.

The CPU 1, the TRi timer 6, the ROM 7, the RAM 8, the I/O port 17 and the serial interface circuit 19 are connected to each other through an address bus 32 which transfers program addresses, a data bus 33 which transfers and receives data, and a control bus 34 which controls the timing of the address and data transfer.

Reference numeral 53 is the main switch of the camera body, which is pulled up by a pull-up resistor 54 when it is OFF, and connected to the main switch (MSW) terminal on the camera sequence control circuit 52.

Figure 1:
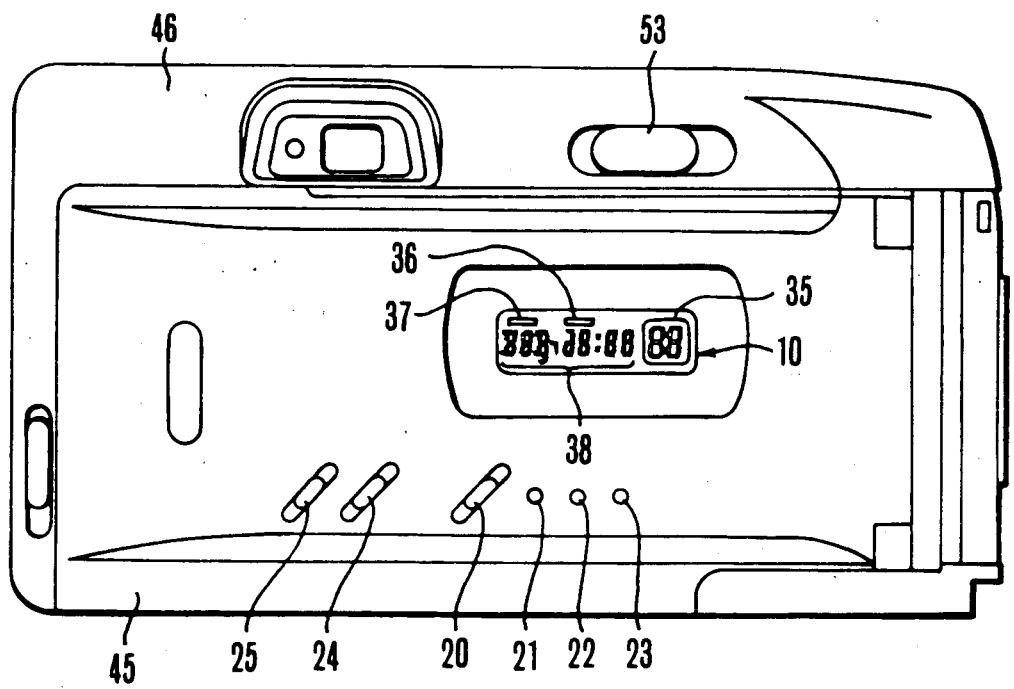
FIG. 1 is a back view of a camera according to the present invention.
Figure 2:
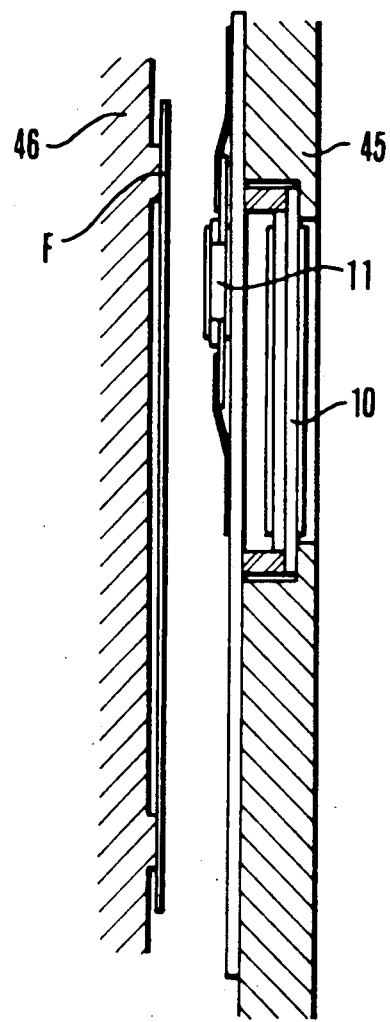
FIG. 2 is a cross-sectional view showing the main part of the dating mechanism on the back side of the camera.

FIG. 1 is a back view of the camera, and FIG. 2 is the cross-sectional view showing the main part of the camera back portion.

In FIGS. 1 and 2, reference numeral 45 is the back cover of the camera, which is designed so that the monitor LCD 10 can be viewed on the back side of the camera and that the switches 20 to 25 can be operated there. This monitor LCD 10 comprises a film counter display section 35, a camera body operation indicating mark 36, a data imprinting recognition mark 37, and display section 38 to recognize the imprinting data selected by the switches 20 to 25.

On the inside of the back cover 45 is placed the data imprinting LCD 11 connected in series to the monitor LCD 10. The data displayed on the data imprinting LCD 11 are to be imprinted by the data imprinting lamp 14 on the surface of a film F serving as photosensitive means placed in the camera body 46.

The operation of this embodiment thus configured and constructed will be described below.

First, the display of the imprinting data recognition display section 38 as well as the display in the interval timer mode and the display in the time lapse imprinting mode will be described.

Concerning the display of the imprinting data recognition display section 38, this display section 38 displays selectively the calendar data in the forms of "year/month/day", "month/day/year", "day/month/year" and "day/hour/minute" as well as the "film exposed-frame number information imprinting mode" (hereinafter referred to as FC mode) and "imprinting OFF mode" in this order each time when a data imprinting mode selector switch 20 is turned on. This display section 38 has a segment layout to display any of the abbreviated month names in English, and by operating the switch 20, permits display of any English month name (FIG. 5) as well as any month name in numerical form (FIG. 6), selectively. If any calendar information such as "year/month/day", "month/day/year", "day/month/year" or "day/hour/minute" is displayed on the display section 38, each display may be incremented by operating the imprinting data modifying switches 21, 22 and 23.

Figure 9:
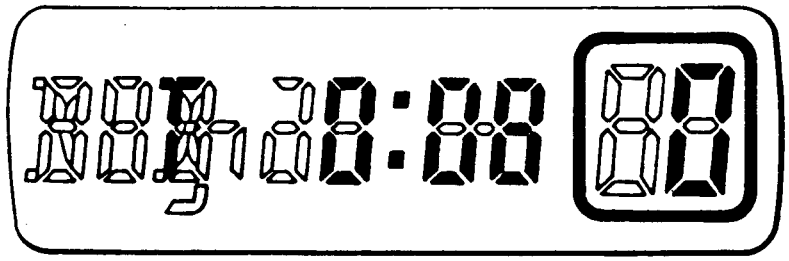

Concerning the interval timer mode, when the interval timer mode switch 25 is turned on, the display section 38 is switched from the data imprinting mode into the interval timer mode and displays in hours and minutes the time Ti which passes from the pressing of the release button to the generation of a release signal (FIG. 9). Such display may be modified by means of the modifying switches 22 and 23.

Figure 10:
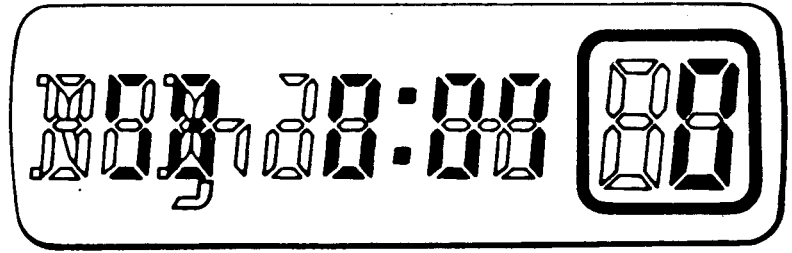

When the interval timer mode switch 25 is turned on again, the display section 38 starts the operation as the countdown timer by adding the data in seconds, as shown in FIG. 10, if the main switch 53 on the camera body 46 is set to ON. If the main switch 53 on the camera body 46 is set to OFF, however, the display section 38 is switched into the display format which had been provided before it was switched into the interval timer mode, and does not provide the countdown information any more. Operating as the countdown timer, the display section 38 then recovers the display format which had been provided before it was switched into the interval timer mode (for example, FIGS. 5 to 7), 10 seconds before the release is operated, and the CPU 1 transmits a self-timer startup signal to the camera body 46.

When the signal indicating that the release is operated enters the CPU 1 through the serial interface circuit 19, the display section 38 starts to operate again as the countdown timer on countdown-displaying the time Ti in seconds. If the release end signal does not enter the CPU 1 within the predetermined time after the self-timer starts up, the interval timer mode is cancelled, and the display section 38 recovers the display format which had been provided before it was switched into the interval timer mode, and does not provide the countdown display any more. If any release signal enters the circuit of this display section 38 from the camera body during the counting-down by the interval timer, or if the data imprinting mode selector switch 20 is turned on during the countdown operation, the countdown operation is stopped and the display section 38 recovers the display format which had been provided before it was switched into the interval timer mode.

Concerning the time lapse imprinting mode (hereinafter referred to as "PA mode"), the display section 38 is switched into the time lapse display mode despite providing the previous display format in the data imprinting mode, when the time lapse imprinting switch 24 is turned on.

Figure 11:
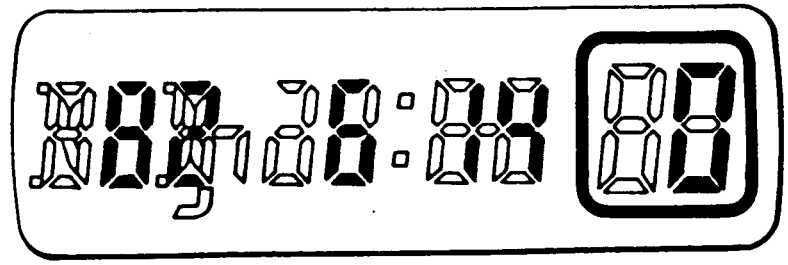

When the switch 24 is ON, the date "year/month/day" from which the lapse of time is counted is displayed (FIG. 11). While this switch 24 is being pressed down, the starting date (year/month/day) may be modified by means of the modifying switches 21 to 23.

The date "year/month/day" is displayed in the format which had been provided before the display section 38 is switched into PA mode, if it is possible. If it is impossible, for example, if the display has been in the format "day/hour/minute" in imprinting mode, or if the display section 38 has been in "FC mode" or "imprinting OFF mode", the date "year/month/day" is displayed in numerical format as shown in FIG. 11.

Next, when the switch 24 is turned off, the lapse of time (the current date to the count starting date) $\Delta T$ is displayed, and it is imprinted when the date signal from the camera body 46 enters the circuit of the display section 38.

It is understood that the lapse of time $\Delta T$ is updated as the current date is updated.

Figure 12:
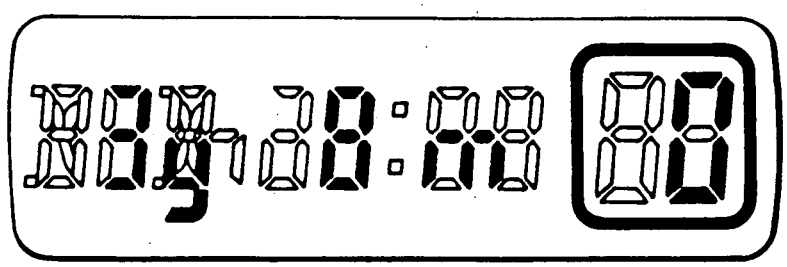
Figure 13:
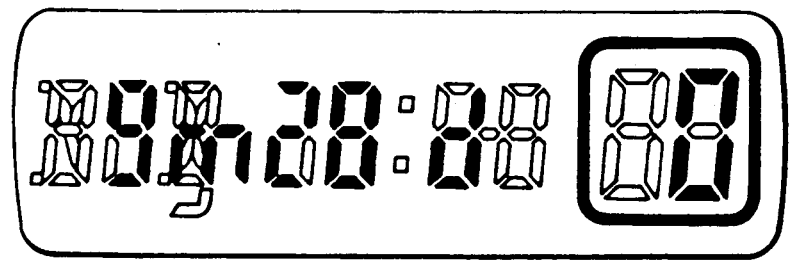
Figure 14:
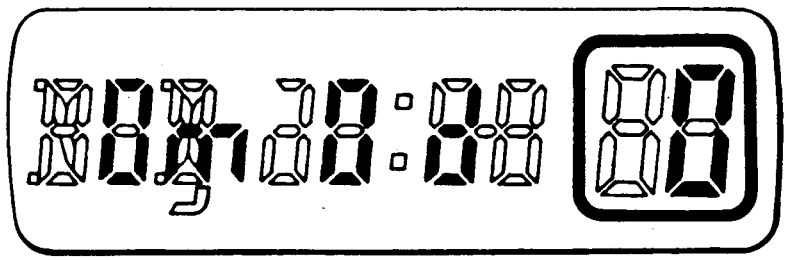

The display format on the display section 38 is "year/month" (in the display form of "XyXm" wherein X denotes a numeral, y denotes the year and m denotes the month), for $\Delta T > 12$ months (FIG. 12), "month/day" (in the display form of "XmXd" wherein d denotes the day), for $\Delta T \leq 12$ months (FIG. 13), and "0 month/0 day" (in the form of "0m0d") for $\Delta T \leq 0$ (FIG. 14), as shown in FIGS. 12 to 14.

Incidentally, the above small letters "y" and "m" are displayed by using an auxiliary segment which extends straight from one segment of plural digits arranged in the form of "8" and comprised of seven segments and is bent at a right angle halfway, as shown in FIGS. 12 to 14.

When the data imprinting mode selector switch 20 is turned on, the display section 38 recovers the current-date format which had been provided before it was switched into the PA mode, in whatever format the display has been.

By using the film exposed-frame number imprinting mode (FC mode), the interval timer mode and the PA mode in combination, it is possible to imprint information about the date and time, film frame number and the number of days selectively on the photos recorded on film at fixed intervals of time, so that the photography records and pictures will be easily arranged.

Next, the input unit which receives the information from the camera body 46 through the serial interface circuit 19 in this embodiment of the system will be described below.

In this embodiment, the data imprinting signal, the film frame counter information, and other camera information, etc. from the camera body 46 through the serial interface circuit 19 enter the input unit. As it is given in Table 1, the 16-bit serial data comprising D0 to D3 of 4 bits each is transferred from the camera body 46 in this transmission format. D0 and D1 are BCD codes corresponding to the higher place and lower place of 2 digits on the film frame counter respectively. D2 is the data imprinting signal and camera information. D2 is a data imprinting signal (also, a release signal) when bit 3 (MSB) is 1, and the data imprinting lamp lighting time may vary from $t_0$ to $t_7$ msec according to the values of the low order bits (bit 2, bit 1 and bit 0. When bit 3 in D2 is 0, the photography information mark (PIM mark) is turned on for bit 2=1 and turned off for bit 2=0. If bit 3 is 0, the main switch 53 of the camera is set to ON for bit 1=1 and set to OFF for bit 1=0. If bit 3 is 0, the main switch 53 is latched in the previous state. D3 is four spare bits.

TABLE 1

| D0<br>MSB LSB<br>**** | D1<br>MSB LSB<br>**** | D2<br>MSB LSB<br>**** | D3<br>MSB LSB<br>**** |
|---|---|---|---|
| High-order Place of 2 digits on counter | Low-order place of 2 digits on counter | Data imprinting signal and camera information | Spare bits |
| | | 0XXX: No imprinting | |
| | | 1000: $t_0$ msec | |
| | | 1001: $t_1$ msec | |
| | | 1010: $t_2$ msec | |
| | | 1011: $t_3$ msec | |
| | | 1100: $t_4$ msec | |
| | | 1101: $t_5$ msec | |
| | | 1110: $t_6$ msec | |
| | | 1111: $t_7$ msec | |
| | | 01XX: PIM mark ON | |
| | | 00XX: PIM mark OFF | |
| | | 0X1X: Camera body main switch 53 ON | |
| | | 0X0X: Camera body main switch 53 OFF | |

TABLE 2-1

RAM
$b_3$ ... MSB of 4 bits
$b_0$ ... LSB of 4 bits
— ... not used

| Address label | Contents |
|---|---|
| STATUS0 | MSB = "1" ... Any display except for those in normal mode 3 low-order bits:<br>= "000" ... Imprinting OFF mode<br>= "001" ... "year/month/day" mode<br>= "010" ... "month/day/year" mode<br>= "011" ... "day/month/year" mode<br>= "100" ... "day/hour/minute" mode<br>= "101" ... Film frame counter mode |
| STATUS1 | $b_3 = 1$ ... TRi port = H output state<br>$b_2 = 1$ ... Interval timer waiting state<br>$b_1 = 1$ ... Interval timer operating state<br>$b_0 = 1$ ... — |
| STATUS2 | $b_3 = 1$ ... Data modifying state<br>$b_2 = 1$ ... —<br>$b_1 = 1$ ... Reference date setting state in PA mode<br>$b_0 = 1$ ... Interval timer time setting state |

TABLE 2-2

| Address label | Contents |
|---|---|
| STATUS3 | $b_3 = 1$ ... —<br>$b_2 = 1$ ... —<br>$b_1 = 1$ ... LCD display change request flag<br>$b_0 = 1$ ... — |
| STATUS4 | $b_3 = 1$ ... PA data imprinting mode in interval timer mode<br>3 low-order bits:<br>= "001" ... —<br>= "010" ... Reference date display in PA mode<br>= "011" ... Time lapse display in PA mode<br>= "100" ... Interval timer setting display<br>= "101" ... Countdown display during the interval timer operation |
| STATUS5 | $b_3 = 1$ ... REC port = H output state<br>$b_2 = 1$ ... —<br>$b_1 = 1$ ... —<br>$b_0 = 1$ ... — |

TABLE 2-3

| Address label | Contents |
|---|---|
| STATUS6 | $b_3 = 1$ ... —<br>$b_2 = 1$ ... —<br>$b_1 = 1$ ... State that the interval timer time has been counted down to 10 sec or less<br>$b_0 = 1$ ... iNT port in H output state |
| SECOND0 | Low-order second digit of current time |
| SECOND1 | High-order second digit of current time |
| MiNUTES0 | Low-order minute digit of current time |
| MiNUTES1 | High-order minute digit of current time |
| HOUR0 | Low-order hour digit of current time |
| HOUR1 | High-order hour digit of current time |
| DAY0 | Low-order day digit of current date |
| DAY1 | High-order day digit of current date |
| MONTH | Month number of current date |
| YEAR0 | Low-order year digit of current date |
| YEAR1 | High-order year digit of current date |

TABLE 2-4

| Address label | Contents |
|---|---|
| PDAY0 | Low-order day digit of reference date in PA mode |
| PDAY1 | High-order day digit of reference date in PA mode |
| PMONTH | Month digit of reference date in PA mode |
| PYEAR0 | Low-order year digit of reference date in PA mode |
| PYEAR1 | High-order year digit of reference date in PA mode |
| QDAY0 | Low-order day digit of time lapse in PA mode |
| QDAY1 | High-order day digit of time lapse in PA mode |
| QMONTH | Month digit of time lapse in PA mode |
| QYEAR0 | Low-order year digit of time lapse in PA mode |
| QYEAR1 | High-order year digit of time lapse in PA mode |
| TRXM0 | Low-order minute digit of interval timer set-time |
| TRXM1 | High-order minute digit of interval timer set-time |
| TRXH0 | Low-order hour digit of interval timer set-time |
| TRXH1 | High-order hour digit of interval timer set-time |
| TRSEC0 | Low-order second digit on counter for interval timer |
| TRSEC1 | High-order second digit on counter for interval timer |
| TRMiN0 | Low-order minute digit on counter for interval timer |
| TRMiN1 | High-order minute digit on counter for interval timer |
| TRHOUR0 | Low-order hour digit on counter for interval timer |
| TRHOUR1 | High-order hour digit on counter for interval timer |

TABLE 2-5

| Address label | Contents |
|---|---|
| SWX0 | $b_3 = 1$ ... Switch 23 in pressed state<br>$b_2 = 1$ ... Switch 22 in pressed state<br>$b_1 = 1$ ... Switch 21 in pressed state<br>$b_0 = 1$ ... Switch 20 in pressed state |
| SWY0 | $b_3 = 1$ ... —<br>$b_2 = 1$ ... —<br>$b_1 = 1$ ... Switch 24 in pressed state<br>$b_0 = 1$ ... Switch 25 in pressed state |
| SiO3B | Read D3 of serial data |
| SiO2B | Read D2 of serial data |
| SiO1B | Read D1 of serial data |
| SiO0B | Read D0 of serial data |
| SiOC | Read the rising pulse count of serial clock |

TABLE 2-6

| Address label | Contents |
|---|---|
| COUNT0 | Counter to count 32 Hz (for watch) |
| COUNT1 | Counter to count 4 Hz (for watch) |
| COUNT3 | Counter to count 32 Hz (for interval timer) |
| COUNT4 | Counter to count 4 Hz (for interval timer) |
| COUNT5 | Counter to count 32 Hz |
| COUNT6 | Counter to count 4 Hz |
| iNTCNT | Counter to count iNT port = H output time |
| FR0 | Low-order digit on film frame counter |
| FR1 | High-order digit on film frame counter |

The contents of the data memory of the RAM 8 will be described below in reference to Table 2, where the address label and the contents are placed left and right, respectively.

In STATUS0, $b_3$ (MSB)=1 indicates any other displays, such as PA mode and interval timer displays, other than normal data imprinting displays. The 3 low-order bits, $b_2$, $b_1$ and $b_0$, indicate normal data imprinting mode; imprinting OFF mode for "000", "year/month/day" mode for "001", "mont/day/year" mode for "010", "day/month/year" mode for "011", "day/hour/minute" mode for "100" and film frame counter imprinting mode for "101".

In STATUS1, $b_3=1$ indicates the TRi port=high (H) level output state. $b_2=1$ indicates that the interval timer has delivered the signal iNT port=H level and is in waiting state until it receives the status signal of the main switch 53 from the camera body 46. Bit $b_1=1$ indicates the interval timer countdown operation. $b_0$ is not used.

In STATUS2, $b_3=1$ indicates that data is being modified by the switches 21 to 23 as shown in FIG. 1. Bit $b_2=1$ is not used. Bit $b_1=1$ indicates the reference date setting state in PA mode. Bit $b_0=1$ indicates that the interval timer is in time setting state.

In STATUS3, $b_1=1$ indicates the flag which requests to display the LCD presentation changed. Bits $b_3$, $b_2$ and $b_0$ are not used.

In STATUS4, $b_3=1$ indicates the PA mode data imprinting in interval timer mode. The 3 low-order bits, $b_2$, $b_1$ and $b_0$, are used to specify the display mode and the display type; reference date display in PA mode for "010", time lapse display in PA mode for "011", interval timer setting display for "100" and interval timer countdown display for "101".

In STATUS5, $b_3=1$ indicates that the REC port 22 is in high (H) level state. Bits $b_2$, $b_1$ and $b_0$ are not used.

In STATUS6, $b_1=1$ indicates that the interval timer has counted down the time to 10 sec or less. Bit $b_0=1$ indicates iNT port=H level output state. Bits $b_3$ and $b_2$ are not used.

SECOND0 to YEAR1 store the low-order second digit to the high-order year digit of the current date and time. PDAY0 to PYEAR1 store the low-order day digit to the high-order year digit of reference date in PA mode.

QDAY0 to QYEAR1 store the low-order day digit of the time lapse to the high-order year digit of the time lapse.

TRXM0 to TRXH1 indicate the low-order minute digit to the high-order hour digit of the interval timer set time, respectively. TRSEC0 to TRHOUR1 indicate the low-order second digit to the high-order hour digit of the interval timer countdown counter, respectively.

In SWX0, $b_3=1$ indicates the switch 23 being in pressed state, $b_2=1$ the switch 22 in pressed state, $b_1=1$ the switch 21 in pressed state, and $b_0=1$ the switch 20 in pressed state.

In SWY0, $b_1=1$ indicates the switch 24 being in pressed state, and $b_0=1$ the switch 25 in pressed state. Bits $b_3$ and $b_2$ are not used.

SiO3B to SiO0B read and store the 4-bit of each of D3 to D0 of the serial data, respectively.

SiOC is a counter which counts the clocks as the serial codes enters it, and is reset when the buffers (SiO3B, SiO2B, SiO1B and SiO0B) complete the reading of said serial codes (D0, D1, D2 and D3).

COUNT0 and COUNT1 are 32 Hz and 4 Hz counters for the watch. COUNT3 and COUNT4 are 32 Hz and 4 Hz counters, respectively, for the interval timer. COUNT5 and COUNT6 are auxiliary 32 Hz and 4 Hz counters respectively. iNTCNT is a counter which counts the iNT port output time with each interrupt signal 32 HziNT when the iNT port is in H level state.

FR0 and FR1 store the low-order and high-order digits in the film frame counter imprinting mode, respectively.

Now, the sequential operation of the microcomputer will be described below with reference to FIGS. 15A to 15D and FIGS. 16A to 16R, flowcharts illustrating the software.

Figure 15A:
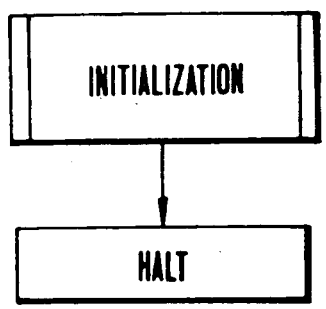
FIGS. 15A to 15D are flowcharts illustrating the control software.
Figure 15B:
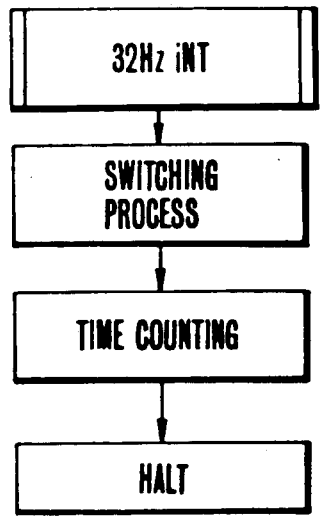
Figure 15C:
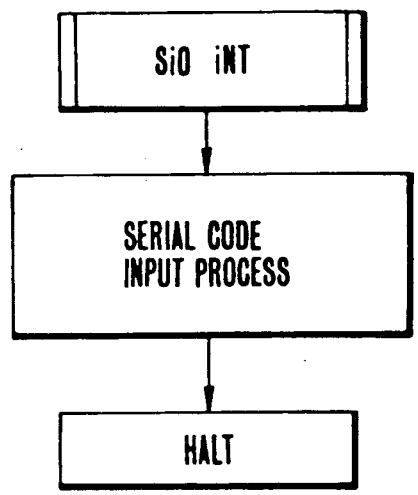
Figure 15D:
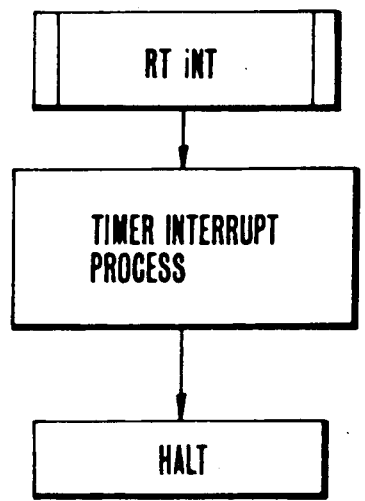

FIGS. 15A to 15D are the schematic flowcharts of the program. This program is roughly divided in 4 blocks. The first block is for initialization, as shown in FIG. 15A. This block is used to clear the memory areas, to set the first display data and to adjust the display after the microcomputer has been powered on the reset. After the initialization was completed, the CPU 1 goes into HALT state where the stored data are held in it. As shown in FIG. 15B, 32 HziNT is a processing sequence for the interrupt signals which are produced at the rate of 32 signals per second with the 32 Hz pulses transmitted by the frequency dividing circuit 5 as shown in FIG. 3. This sequence is used to monitor the switches 20 to 25 and process these signals in response to the pressed state of the switches 20 to 25, and to produce a carry signal of 1 second for incrementing the watch and calendar, when 32 interrupt signals are counted up. As shown in FIG. 15C, SiOiNT is a processing sequence for the serial interrupt signal which is produced when the CPU 1 receives the serial codes from the camera body 46, and it is used to process the input of the data imprinting lamp lighting and camera information. RTiNT as shown in FIG. 15D is a processing sequence for the timer interrupt signal which is generated when the TRi timer counts up, and it is used to process the data imprinting lamp lighting end time.

This embodiment according to the present invention will be described in detail with reference to the flowcharts FIGS. 16A to 16R.

Figure 16A:
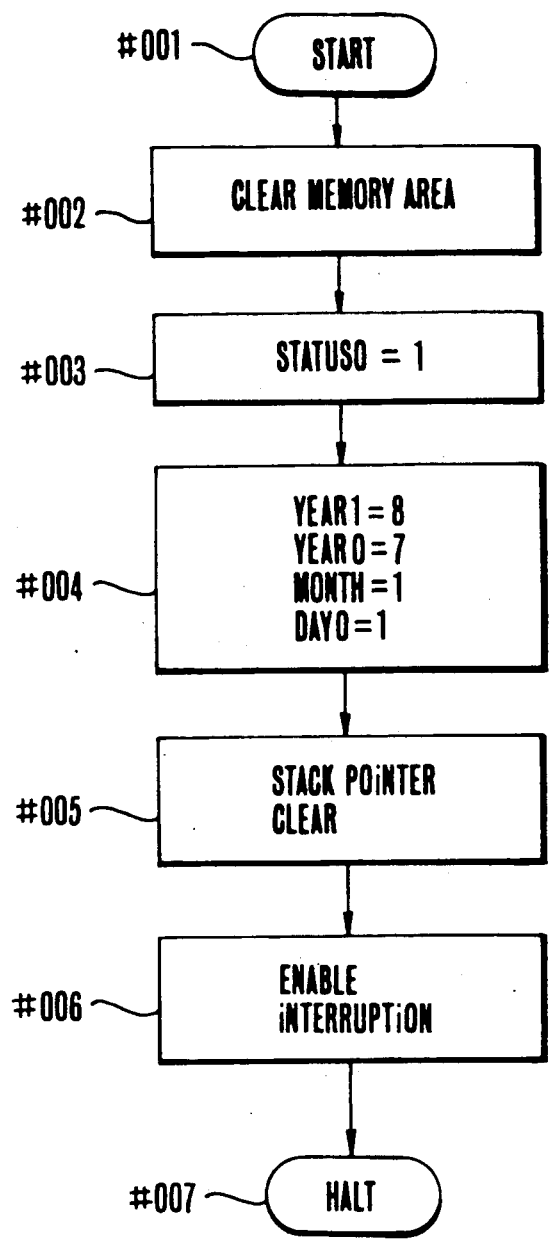
FIGS. 16A to 16R are detailed flowcharts corresponding to the flowcharts shown in FIGS. 15A to 15D.

When the power supply 2 is turned on, the microcomputer is initially reset with the reset (RE) signal produced by the PUC circuit 3, and starts to operate from the program step #001 as shown in FIG. 16A. All the memory areas are cleared at Step #002, the data imprinting mode is switched from the initial display to the "year/month/day" mode at Step #003, and the calendar date is set, for example, to "Jan. 1, 87" at Step #004. At Step #005, the stack pointer area is cleared. The interruption is enabled at Step #006, and the microcomputer goes into HALT state, that is, data holding state, at Step #007.

Figure 16C:
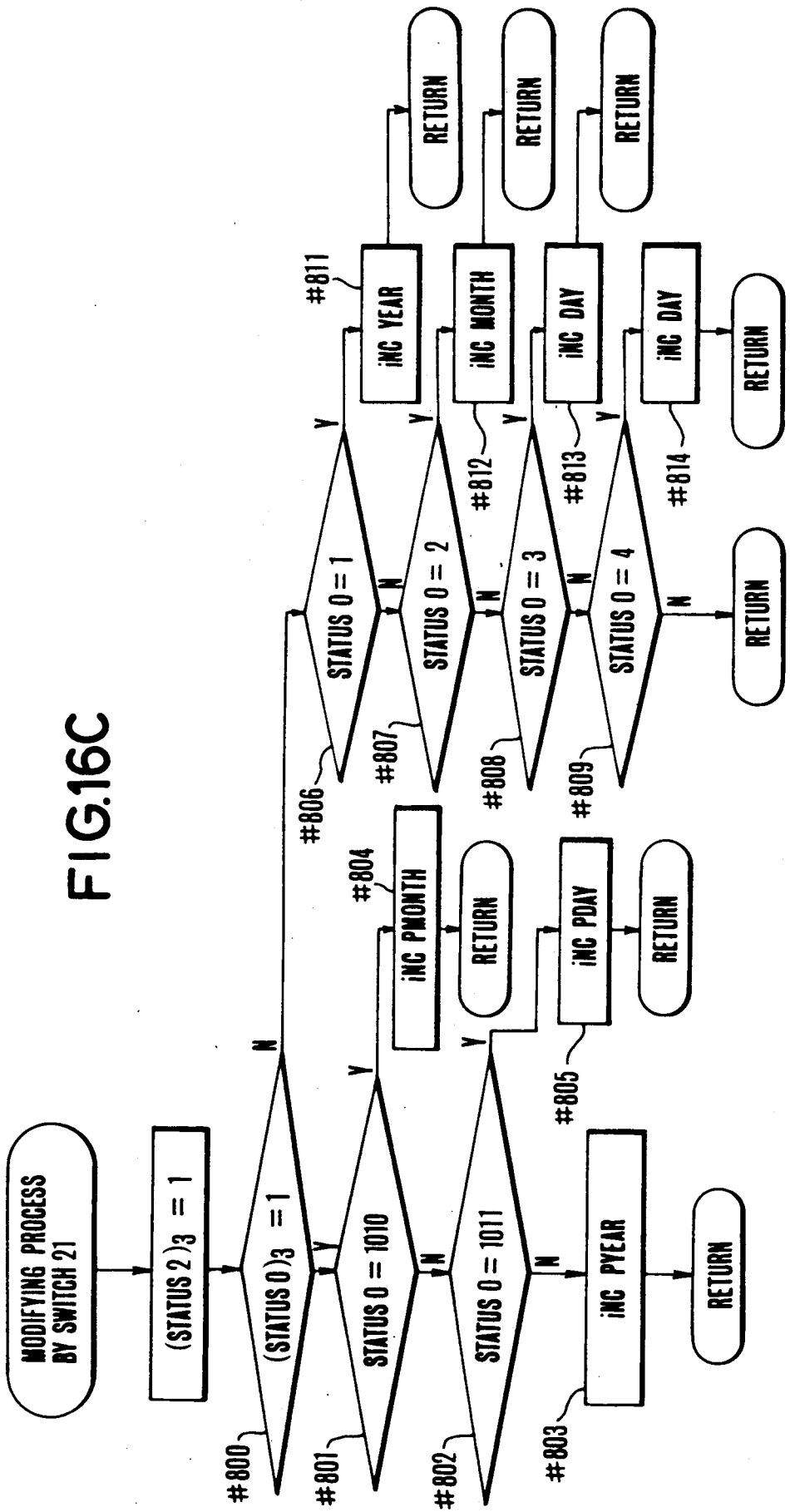
Figure 16D:
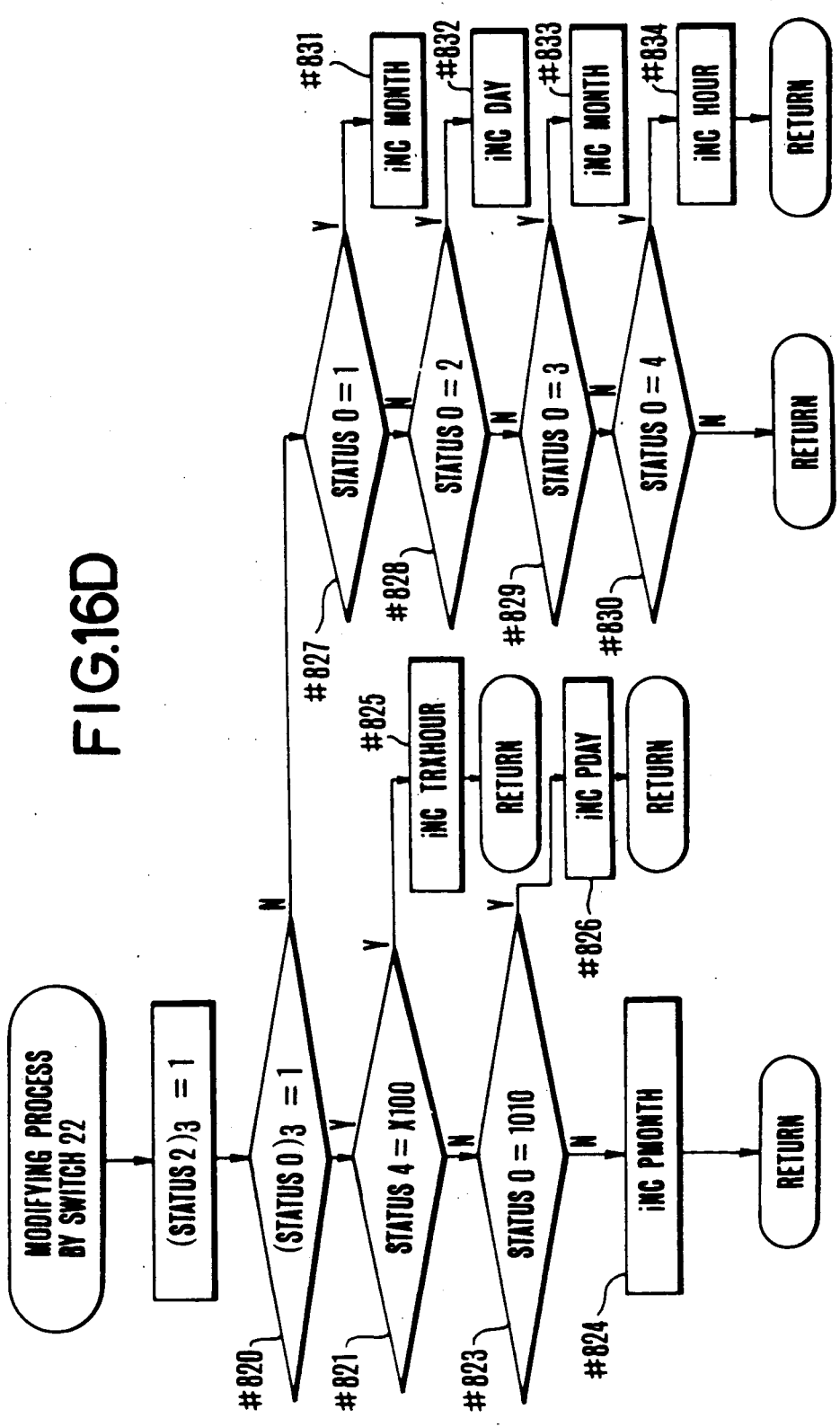
Figure 16E:
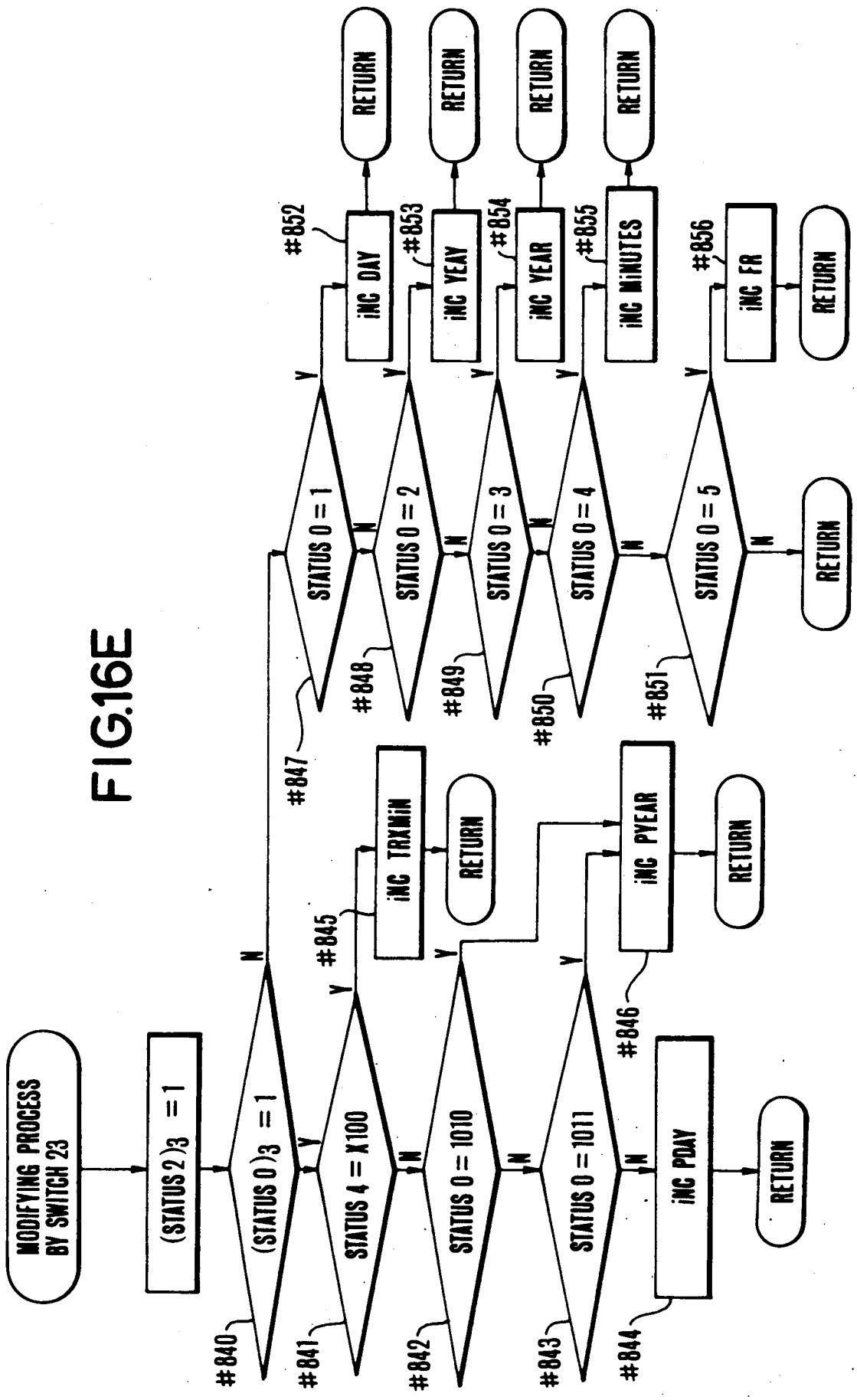
Figure 16F:
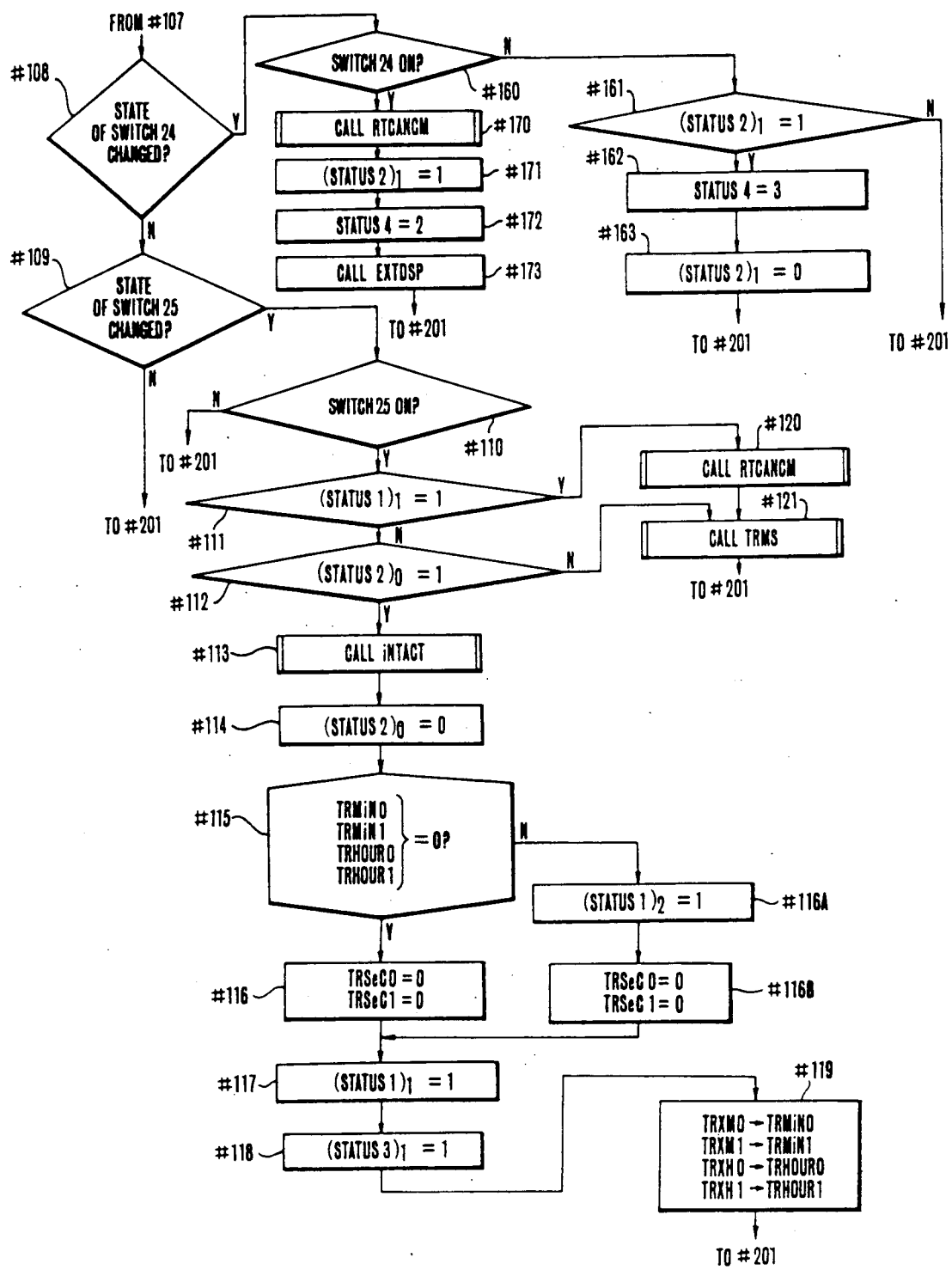

When the CPU 1 receives an interrupt signal 32 HziNT, the microcomputer starts operation from Step #101, as shown in FIG. 16B. At Steps #101 and #102, the states of the switches 20 to 2d5 are read through the switch input port. Then, at Steps #104, #105, #106, #107, #108, and #109 (#108 and #109 are shown in FIG. 16F), it is determined whether the states of the switches 20 to 25 are changed or not, and if any change is detected, the required processing is made. The detailed information on this processing will be given hereinafter. If any switch is not changed in state, the control proceeds from Step #109 to Step #201 (FIG. 16G).

Here, the case will be described when all the switches are pressed down.

First, the case when the switch 20 is pressed down will be described below.

If the pressed state of the switch 20 is detected at Step #104, the control proceeds to Steps #129, #130, #131,

133, #134 and #135, and to Step #201. If it is detected at Step #129 that the time lapse display in PA mode is provided, or if it is detected at Step #130 that the time has been counted down to 10 seconds in the timer mode, the subroutine RTCANCL is called at Step #132 to cancel the PA mode or the timer mode. If the time is not counted down to 10 seconds, it is determined at Step #131 whether the display is in the normal mode or not. If the display is not in the normal mode, the subroutine RTCANCL is called at Step #132 as if the time is counted down to 10 seconds in the timer mode. The processing of the subroutine RTCANCL to cancel the timer will be described hereinafter. When the timer cancel subroutine has been processed, the control proceeds to Step #201.

If it is detected at Step #131 that the display is in the normal mode, STATUS0 is incremented by 1 at Step #133 to advance the data imprinting mode by one. If STATUS0=6 is detected on Step #134, STATUS0=0 is provided at Step #135, where 6 normal data imprinting modes, "year/month/day"→"month/day/year",→"day/month/year"→"day/hour/minute"→"FC mode"→"imprinting OFF mode", and cycled.

The case when the switches 21, 22 and 23 are pressed down will be described below.

If it is detected at Step #105 that the switch 21 is changed in state, the changed state of the switch 21 is determined at Step #105A. If the switch 21 is in pressed state, $b_3=1$ (data modifying state) in STATUS2 is set at Step #140, and $b_1=1$ in STATUS3 display change request flag) is set at Step #141 to update the display because of its contents changed. Then, on Step #142, it is determined which data is corresponding to the switch 21 according to the detection of the values in STATUS0 and STATUS4, and the corresponding data is modified. The detailed information will be provided hereinafter. After the modification has been completed, the control proceeds to Step #201.

If it is detected at Step #105A that the switch 21 is set to OFF after the state was changed, $b_3=0$ in STATUS2 is set to reset the data modifying state, and $b_1=1$ in STATUS3 (disply change request flag) is set at Step #144. The states of the switches 22 and 23 are determined for any change at Steps #106 and #107, respectively, and subsequently processed as the state of the switch 21 is. Therefore, the processing of the switches 22 and 23 is not described here. After the modification has been completed, the control proceeds to Step #201 for the switches 22 and 23.

If the switch 24 is pressed down (see FIG. 16F), it is detected at Step #108 that the switch 24 is changed in state, and the changed state of the switch 24 is determined at Step #160. If it is detected that the switch 24 is in ON, the subroutine RTCANCM is called at Step #170. The subroutine RTCANCM will be described hereinafter. STATUS2 is set to PA mode reference date setting state at Step #171, and set to PA mode reference date display state at Step #172. At Step #173, the subroutine EXTDSP is called to control the displays in other modes than in normal mode. Then the control proceeds to Step #201.

If it is detected at Step #160 that the switch 24 is OFF after the change in state, it is determined at Step #161 whether it is in the PA mode reference date setting state or not. If it is in setting state, the PA mode time lapse display mode is set at Step #162, and $(STATUS2)_1=0$ is set at Step #163 to cancel the PA mode reference date setting state. Then, the control proceeds to Step #201.

If the switch 25 is set in the pressed state, the change of the switch 25 is detected at Step #109, and the changed state of the switch 25 is determined at Step #110. If the switch 25 is ON, it is determined at Step #111 whether the interval timer has been operated or not. If it is detected that the interval timer has not been operated, it is determined at Step #112 whether the interval timer is in the timer time setting state. If the interval timer is not in the time setting state, the control proceeds to Step #121 and then to Step #201. At Step #121, the subroutine TRMS is called to process the interval timer mode setting.

Figure 16H:
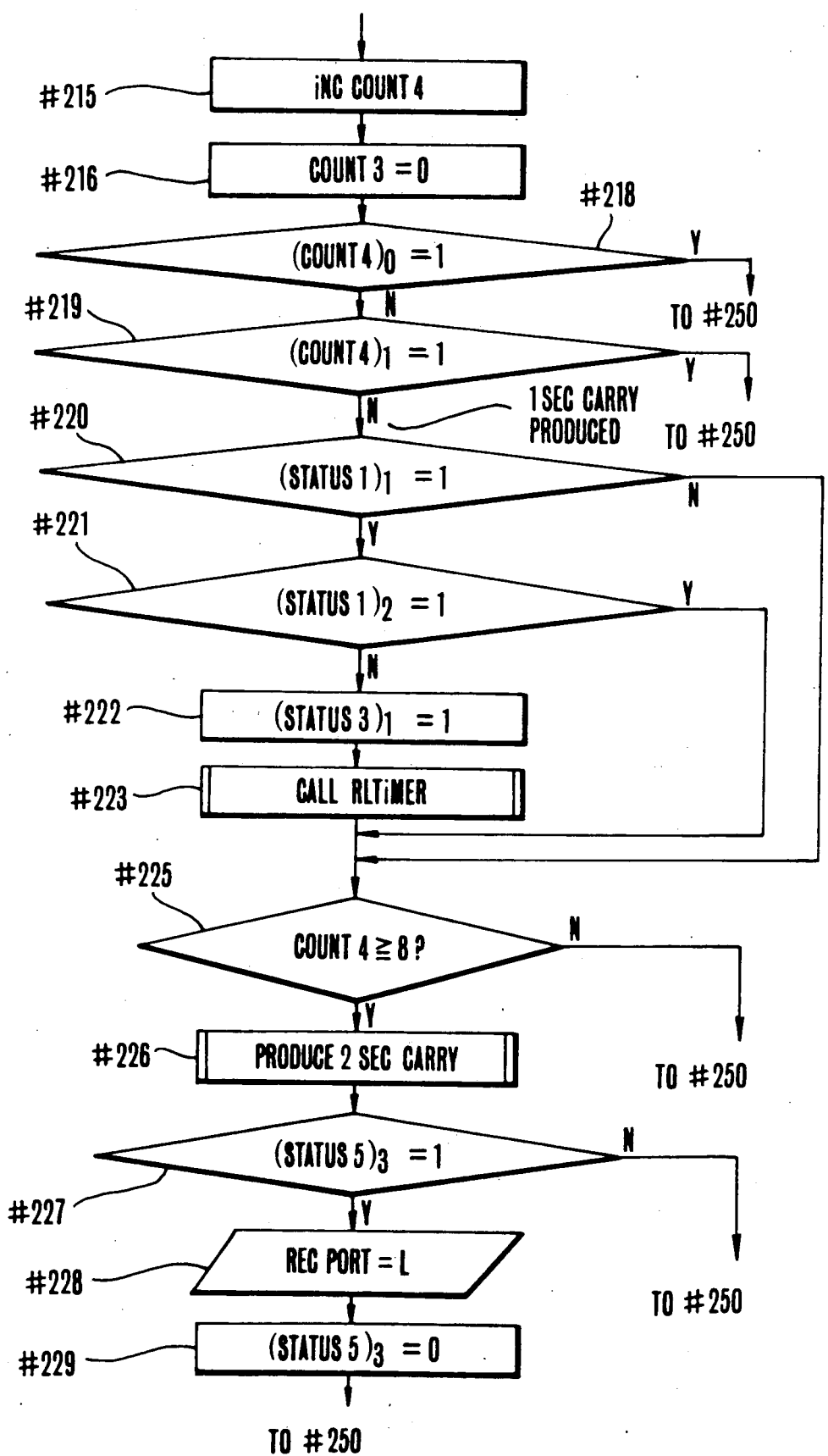
Figure 16I:
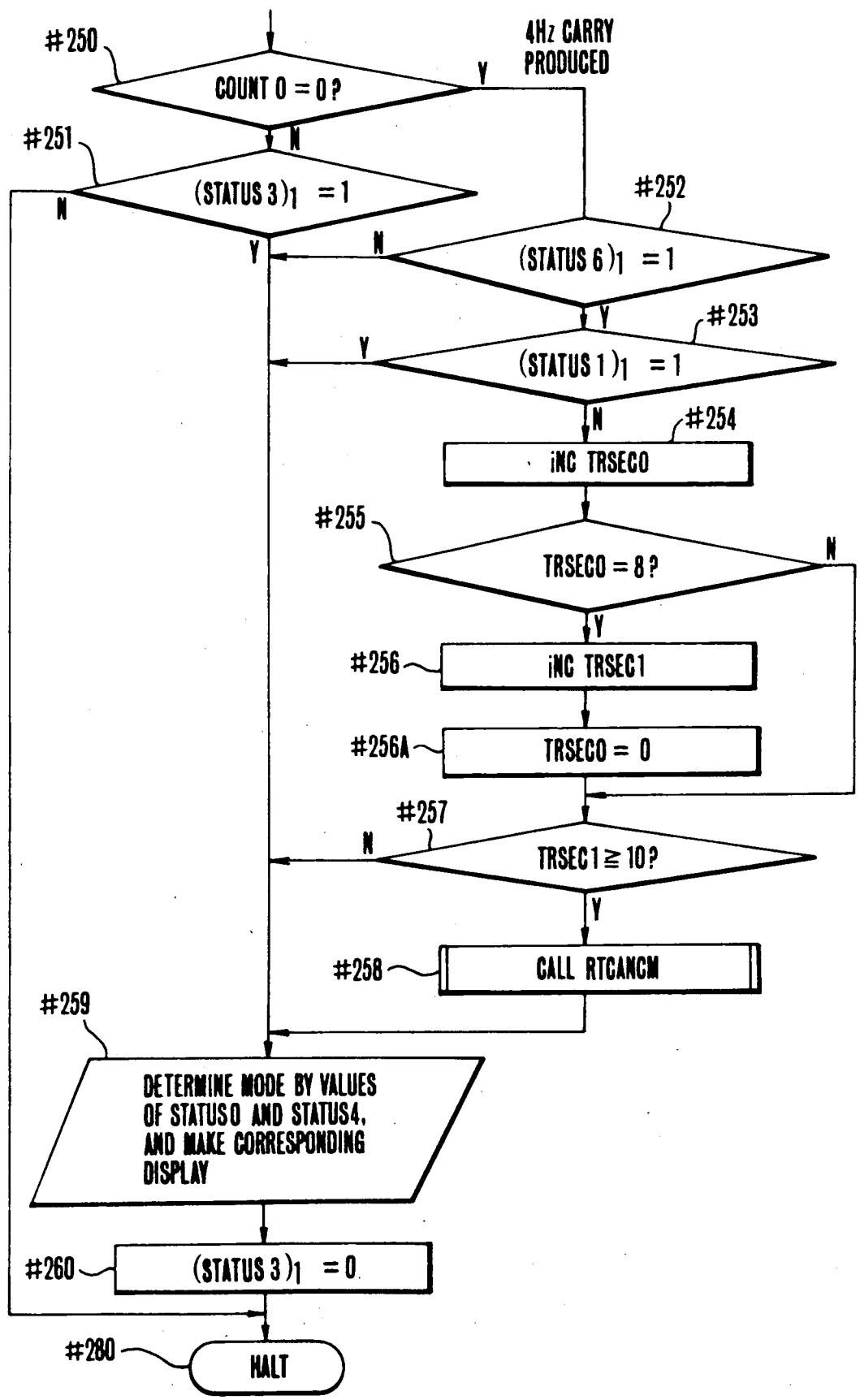
Figure 16K:
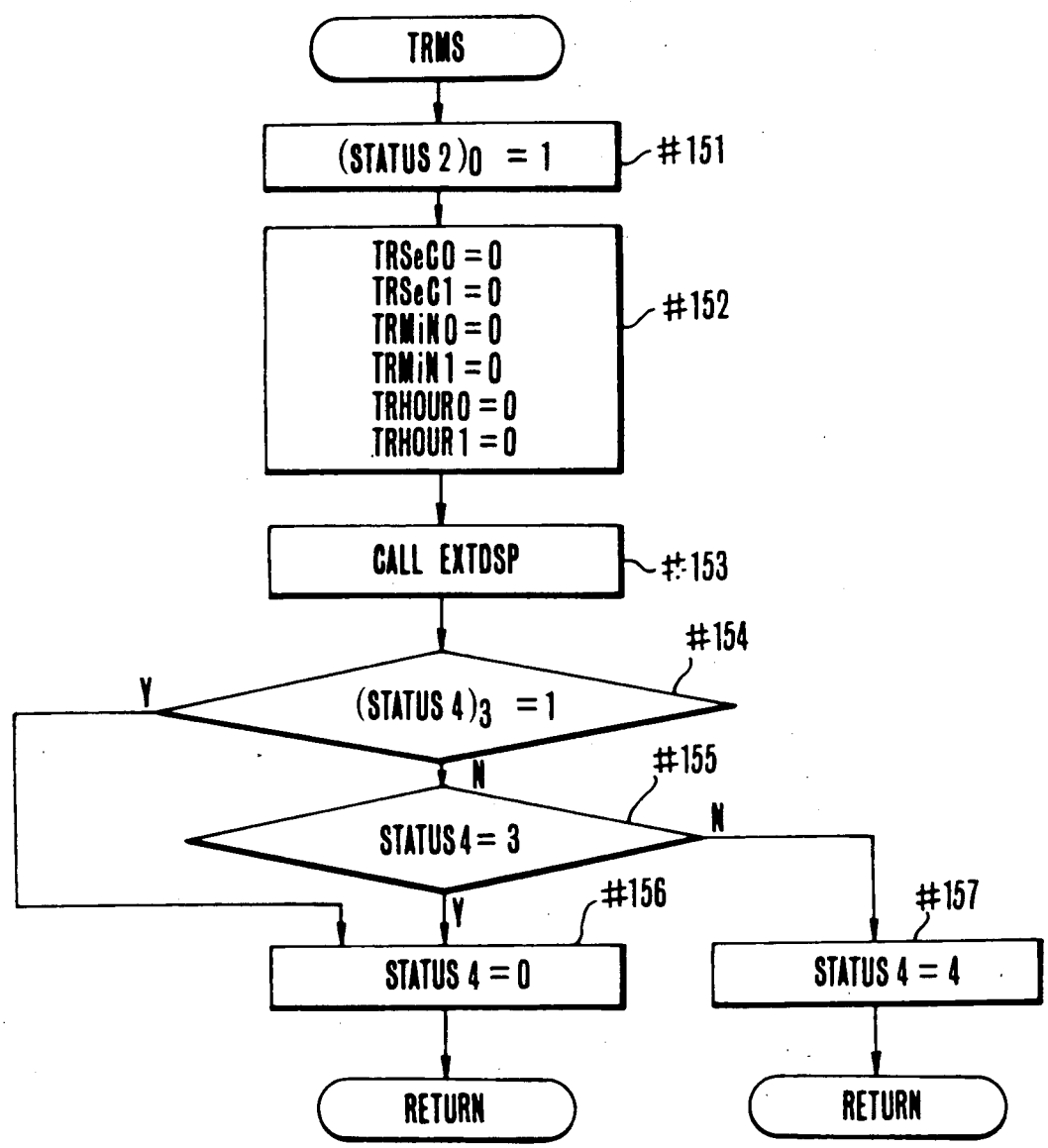

Here, the setting process in the interval timer mode will be described with reference to FIG. 16K.

At Step #151, STATUS is set into the interval timer time setting state. At Step #152, all the digit places, low-order second place to high-order hour place, of the counter watch for the timer are cleared to zero (0). At Step #153, the subroutine EXTDSP is called to process the displays in modes other than the normal mode. This subroutine will be described hereinafter. At Step #154, it is determined if the data imprinting mode in the interval timer mode is PA mode or not. If the data imprinting mode is not in the PA mode, it is determined at Step #155 whether the display is the PA mode time lapse display or not. If it is on time lapse display, bits 3 and 2 in STATUS4 are set at Step #156 to the PA data imprinting mode and interval timer setting state, respectively. If bit 3 in STATUS4 is detected to be set at Step #154, the same operation is provided. If it is detected at Step #155 that the imprinting mode is not in the PA mode, the interval timer setting display state is set at Step #157.

After the interval timer mode setting has been completed, the control proceeds to Step #201. If the interval timer time setting state is detected at Step #112, the control proceeds to Steps #113 and #114, and the interval timer starts operation. At Step #113, the subroutine iNTACT is called to set the iNT port into the active state. The subroutine iNTACT starts from Step #731 (FIG. 16R). The signal iNT port=H is outputted at Step #731. On Step #732, the initial value of the iNTCNT counter for counting iNT port output time is set, and the flag of iNT port=H output is set at Step #733.

Next, the flag of the interval timer time setting state is reset at Step #114, and on Step #115, it is determined whether all the digits in the interval timer are zero or not. If all the digits are zero, since the interval timer time has not been set, the interval timer is brought into a state of 10 seconds before counting up at Step #116 so that the self-timer of the camera body is used as the interval timer. The control comes into a state of waiting to receive a data imprinting signal from the camera body. On the other hand, if it is determined at Step #115 that the interval timer time is not zero, STATUS is set into a state of waiting to receive a main switch state signal (in serial code) from the camera body on the startup of the interval timer. The low-order and high-order second digit places of the interval timer are cleared to zero (0) at Step #116B. At Step #117, the interval timer operating state is set, and at Step #118, the display change request flag is set. At Step #119, the interval timer set time of low-order minute digit to high-order hour digit, which was stored on the startup of the timer, is copied in the RAM area which counts it down. Subsequently, the control proceeds to Step #201.

How to determine modes and modify data, if the switches 21, 22 and 23 are pressed down, will be described below with detail in reference to FIGS. 16C, 16D and 16E.

At first, the modification by the switch 21 will be described. In FIG. 16C, at Step #800, it is determined whether MSB in STATUS0 is set or not, and if it is set, it indicates any display in a non-normal mode. If the display is detected at Step #801 to be in the PA mode and in the form of "month/day/year", the switch 21 corresponds to the place "month". As a result, the "month" place PMONTH of the time lapse reference date is incremented at Step #804. If the display mode is "day/month/year", the switch 21 corresponds to "day". Then, the "day" PDAY of the time lapse reference date is incremented at Step #805. If the display format is neither "month/day/year" nor "day/month/year", the format "year/month/day" is selected as a reference date display format in the PA mode. Then, the switch 21 corresponds to the place "year", and the "year" PYEAR is incremented at Step #803. If the normal display mode is detected at Step #800, Step #806, #807, #808 or #809 is used to determine and detect the display mode, and the digit place corresponding to the switch 21 is incremented at Step #811, #812, #813 or #814 respectively, as it is in the PA mode.

Next, the modification by the switch 22 will be described below. In FIG. 16D, the display is judged to be in a non-normal mode if it is detected at Step #820 that MBS in STATUS0 is set, as it is in the case of modification by the switch 21. If it is detected at Step #821 that the display is in the interval timer time setting mode, the switch 22 corresponds to the place "hour" of the timer time setting display, and the "hour" TRXHOUR is incremented at Step #825. At Steps #823 and #826, or at Steps #823 and #824, the modification of the PA mode reference date digit corresponding to the switch 22 is similar to that for switch 21.

If the normal display mode is detected at Step #820, the display mode is determined and detected at Step #827, #828, #829 or #830, and the digit corresponding to switch 22 is incremented at Step #831, #832, #833 or #834, respectively, as it is in the case of switch 21.

Finally, the modification by switch 23 will be described below, with reference to FIG. 16E. If the interval time time setting mode is determined and detected at Steps #840 and #841, the timer minute digit (TRXMiN) corresponding to switch 23 is incremented at Step #845, as it is in the case of switch 22. If the display is in the normal mode, the display mode is determined at Steps #847, #848, #849 or #850, and the digit corresponding to switch 23 is incremented at Step #852, #853, #854 or #855, respectively, as it is in the cases of the switches 21 and 23.

After the monitor processing of the switches 20 to 25 has been completed, as described above, the 32 Hz interrupt process is followed by the watch increment process and the timer countdown process at Steps #201 and subsequent processes (see FIG. 16G).

At Step #201, it is determined whether the iNT port is in an active state or not. If the iNT port is active, the iNT port output time counter iNTCNT is decremented by 1 at Step #202, and it is determined if iNTCNT=0 or not at Step #203. If iNTCNT=0, the subroutine iNTSTP is called at Step #204 to provide iNT port=L.

The iNTSTP subroutine will be described by using Steps #751 and subsequent steps in FIG. 16R.

The iNT port=H is set at Step #751, and iNT port in active state is canceled at Step #752. The iNT port output time is $1/32$ Hz$\times 7 = 218$ msec, because the initial value of the iNTCNT is 7.

Steps #205 to #210 are provided for the increment process of the data imprinting watch and calendar. The 32 Hz counter COUNT0 for the watch is incremented at Step #205. If COUNT0=8 is detected at Step #206, a 4 Hz carry is outputted to increment the 4 Hz counter COUNT1 by 1 at Step #207 and at the same time, to clear COUNT0 to zero (0) at Step #207A. At Step #208, COUNT1=4 is checked. If it is 4, a carry signal of 1 second is delivered on Step #209, and the watch and calendar are incremented at Step #210. It is determined on Step #211 whether the timer is operating or not. If the timer is operating, REC port=H output state is not checked at Step #212. This means that in addition to the above-described watch counter, 32 Hz and 4 Hz counters used at Steps #213 and #215 are separately provided to count down the timer set time during the interval timer operation and to count the output time of the data imprinting recognition mark (REC port) during the output thereof, so that the control will jump to Steps #250 and subsequent without passing Steps #213 and subsequent for counting, if the interval timer is not operating or if REC port=H output state is not detected. If the interval timer is operating or if REC port=H output state is detected, another 32 Hz counter COUNT3 separately provided from the above-described COUNT1 is incremented by 1 at Step #213, and it is determined at Step #214 whether COUNT3=8 is true or not. If COUNT3=8 is true, a 4 Hz carry signal is produced to increment the 4 Hz counter COUNT4 at Step #215 as shown in FIG. 16H and to clear the 32 Hz counter COUNT3 to zero (0) at Step #216. At Steps #218 and #219, it is then determined whether the contents of the counter COUNT4 is 4 or more. If it is 4 or more, the timer produces a carry signal of 1 second. In these conditions, it is determined at Step #220 whether the interval timer is operating or not. If the interval timer is operating, it is determined at Step #221 whether the interval timer is or is not in main switch state signal (in serial code on timer startup) input waiting state. If the timer is not in waiting state, the control proceeds to Step #222 where the display change request flag is set, and to Step #223 where the subroutine RLTiMER is called to process the countdown operation of the interval timer. The subroutine RLTiMER will be described below by referring to FIG. 16J. The subroutine RLTiMER starts the processing at Step #301. Since the timer counter produced a carry signal of 1 second at Step #219, the low-order second digit TRSEC0 on the interval timer is decremented by 1 at Step #301, and the low-order second digit is checked for 0 at Step #302. If it is zero (0), the high-order second digit is decremented by 1 at Step #303. At Step #304, it is detemined whether the zero flag is set or not on the microcomputer as the result that the high-order second digit was decremented on Step #304. If the zero flag is set, the minute digits, and the hour digits if the zero flag is set as the calculating result of the minute digits, are sequentially decremented at Step #305. At Steps #306, 307 and #308, it is checked if the minute digits=0, hour digits=0, and high-order second digit=1 and low-order second digit=0 are true or not, that is, if the interval timer is 10 seconds before it counts up. If the timer is 10 seconds before counting up, the subroutine iNTACT is called to make the above-described iNT port active at Step #309. Since the control is arranged as described above, if the self-timer of the camera body is set, for example, in 10 seconds, the time left, 10 sec, is checked at this point, and the self-timer of the camera body starts in counting by setting the iNT port to H level.

At Step #310, STATUS is set in the state that the interval timer time has been counted down to 10 seconds or less. At Step #311, it is determined whether the imprinting mode is the normal mode or the PA mode. If it is determined to be the PA mode, the imprinting display is set to the time lapse display at Step #313. On the other hand, if it is determined to be the normal mode, MSB in STATUS0 is made to be zero at Step #312, so that the imprinting display is set to the normal imprinting display. Accordingly, the interval timer countdown display is switched again to the data imprinting information display. At Step #314, the subroutine MDCLR is called to clear the data display area, since the display mode was changed. The subroutine MDCLR is processed at Steps #395 and #396 as shown in FIG. 16O. The display change request flag is set at Step #395, and blank signals are transmitted to all display digit places at Step #396 to clear the display area. On the other hand, if not TRSeC1=1 at Step #307, all the digits of the timer are judged again at Step #315. If all the digits are zero, the timer is in the state of counting up, so that at Step #316 an operating state of the interval timer is cancelled.

At Step #225, it is checked if the 4 Hz counter COUNT4 is 8 or more. If this counter is 8 or more, a carry of 2 seconds is produced at Step #226. If the data imprinting recognition mark output state (REC port=H) is detected on Step #227, REC port=L is set at Step #228 to turn off the REC mark 37. At Step #229, STATUS5 is reset to data imprinting REC mark output state flag. Then, COUNT0=0 is checked at Step #250 (FIG. 16I). If it is not 0, the display change request flag is checked at Step #251. If this flag is set, the display mode is determined according to the values of STATUS0 and STATUS4 at Step #259, and the display information according to the mode is transmitted to the LCD driver 9. At Step #260, the display change request flag is reset, and at Step #280, the CPU 1 is set in HALT state. If COUNT0=0 is detected at Step #250, a 4 Hz carry signal is produced. At Step #252, it is determined whether the interval timer time has been counted down to 10 seconds or less. If it has been counted down within 10 seconds, it is checked at Step #253 if the interval timer is counting down or not. If the timer is not operating, the interval timer is in the state of counting up, similar to that at Step #315, so that the low-order second digit TRSEC0 on the timer is incremented by 1 at Step #254. At Step #255, TRESEC0=8 is checked. If it is 8, the high-order second digit of the timer is incremented by 1 at Step #256, and at the same timer, TRSEC0 is cleared to 0 on Step #256A. At Step #257, it is determined whether TRESEC1 is 10 or more. If it is 10 or more, it means that 20 seconds or more (4 Hz×80 counts) have passed after the timer counted up. Consequently the subroutine RTCANCM is called at Step #258 to cancel the interval timer. The subroutine RTCANCM will be described hereinafter. After the interval timer was canceled, the mode is checked according to the values of STATUS0 and STATUS4, and the display according to the mode is provided at Step #259. Then, the CPU 1 is set in HALT state. If the display change request flag is not set at Step #251, the display information is not changed, and the CPU 1 is set to HALT state.

Figure 16L:
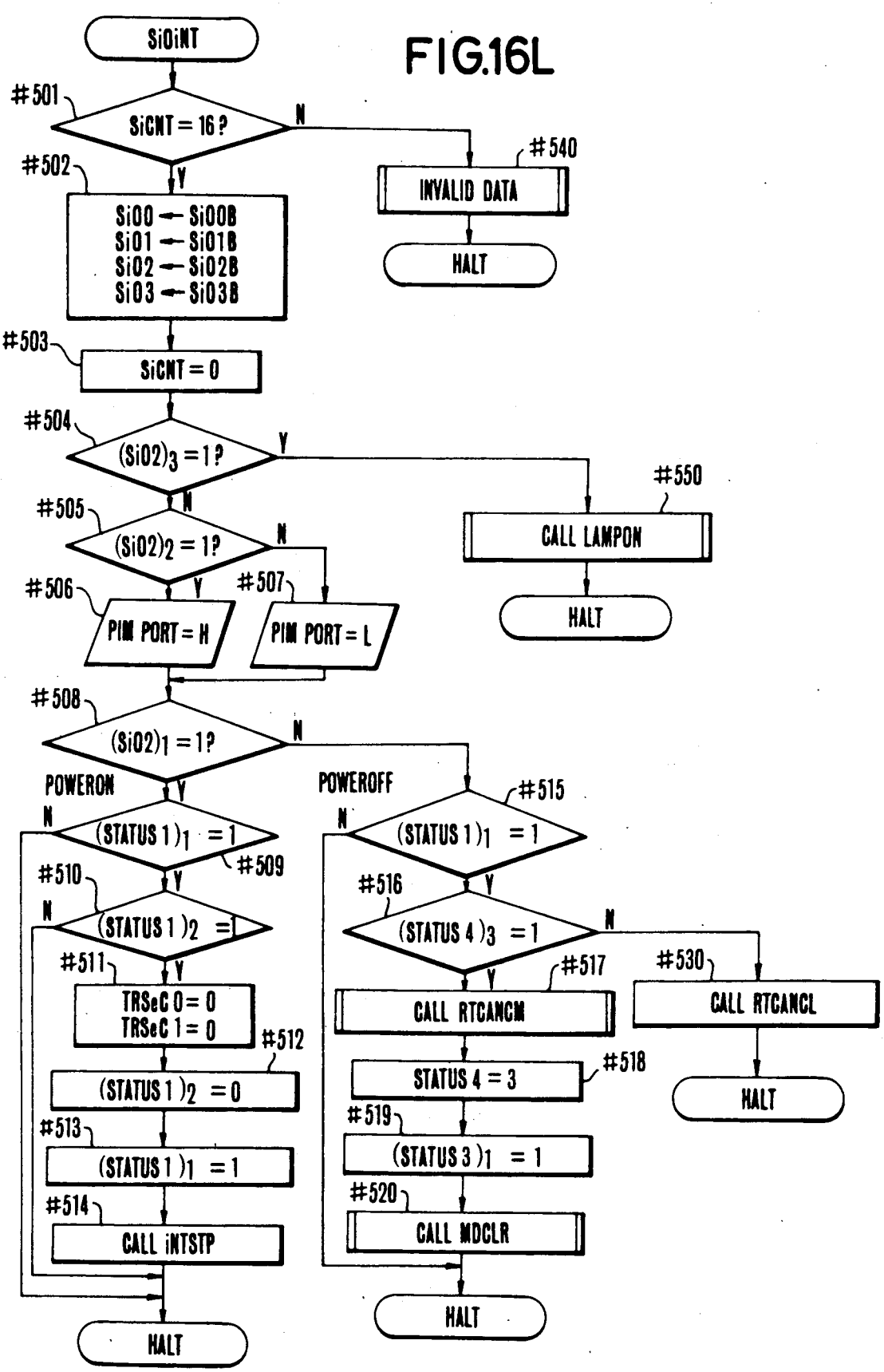

The processing of the serial codes received from the camera body will be described below by referring to FIG. 16L.

When the CPU 1 receives the serial interrupt signal, the program starts to process Step #501 "SiOiNT". At Step #501, it is determined if the contents of the dSiCNT counter which counts the pulses of serial synchronous clocks is 16. If it is not 16, the serial input data are considered to be invalid at Step #540, and the CPU 1 is set in HALT state. If the clock count is 16 with the data valid, the contents of each serial buffer, which are 16-bit serial data divided into 4 groups of 4 bits each, are loaded in the RAM areas SiO0, SiO1, SiO2 and SiO3 on Step #502, and the SiCNT counter is cleared to 0 at Step #503. At Step #504, the bit 3 (MSB) in SiO2 is checked. If the state of bit 3 is 1, it indicates the data imprinting signal (also, the release signal), and the subroutine LAMPON for lighting the data imprinting lamp 14 is called at Step #550. Now, the processing of this subroutine LAMPON will be described below with reference to FIG. 16M. At Steps #601, #602 and #603, it is checked if the lamp has been lighted (TRi port=H), if the data is being modified by the modifying switches and if the PA mode reference date is being set (the switch 24 is in pressed state) respectively. If any of these states is detected, the lamp lighting state is disabled to turn off the lamp. Then, at Step #604, it is checked if STATUS is in the state that the interval timer has been counted down within 10 seconds. If STATUS is in the state, it is determined at Step #630 whether the data display mode is in OFF mode. If it is in OFF mode, the subroutine PHOTOEND is called at Step #631 to prepare for starting the next counting process of the interval timer. If the display mode is not in OFF mode, the control proceeds to Steps #608 and subsequent for the lamp lighting process.

Here, the subroutine PHOTOEND will be described with reference to FIG. 16N. In PHOTOEND, the low-order and high-order second digits on the interval timer counter are cleared to zero (0) at Step #661. At Step #662, the low-order minute digit to high-order hour digit of the interval timer set time stored on the startup are copied in the memory area which counts down in practice. At Step #663, the subroutine EXTDSP is called to process the displays other than the data imprinting information display.

The subroutine EXTDSP starts at Step #350 as shown in FIG. 16P. At Step 351, STATUS is set in displaying state with any mode other than in normal mode. At Step #352, the display change request flag is set, since the display mode is changed. At Step #353, blank signals are transmitted to the digit places of the display area to clear the displayed digits.

After EXTDSP has been processed, the STATUS6 which is in the state that the interval timer has been counted down within 10 seconds is reset at Step #665. At Step #666, the flag of interval timer countdown operation is set. At Step #667, it is checked if the data imprinting mode is PA or time lapse display mode. If it is time lapse mode, the control proceeds to Step #668 where STATUS is set to interval timer mode and PA mode and where the flag for countdown display during the timer operation is set. If it is detected at Step #667 that the data imprinting mode is not PA mode, only the flag for timer countdown display is set at Step #669. Thus, the PHOTOEND process is completed and the control returns to the the subroutine LAMPON. If the data imprinting mode is in OFF mode, the CPU 1 is set to HALT state after having returned from the subroutine LAMPON.

If it is not detected at Step #604 in the subroutine LAMPON that the interval timer has counted down within 10 seconds, it is checked at Steps #605 and #606 if STATUS is in interval timer counting state and in interval timer time setting state, respectively. If STATUS is in any of the two states, the interval timer mode cancel process is performed at Steps #620 and subsequent. This process will be described hereinafter. If STATUS is not detected at Steps #605 and #606 to be in any of these two states, it is determined at Step #607 whether the data imprinting mode is in OFF mode or not. If OFF mode is detected, the CPU 1 exits the data imprinting lamp lighting process and enters the HALT state. If OFF mode is not detected at step #607, the control proceeds to Step #608 where the TRi timer time is set according to the values of the 3 low-order bits in SiO2 and where the timer counting is started. Then, TRi port=H is set at Step #609 to start the lighting of the lamp 14. At Step #610, STATUS is set to TRi port=H output state. The REC mark 37 is lighted at Step #611, and REC port=H output state is set at Step #612. Thus, the lamp lighting process is completed. Then, the control returns to SiOiNT and the CPU 1 is set to HALT state.

If it is detected at steps #605 and #606 that the interval timer is in operating state or in time setting state, respectively, it is checked at Step #620 if STATUS is in interval timer mode and in PA data imprinting mode. Thus, the interval timer cancel means are divided into two. At first, if the interval timer is in PA mode, that is, if MSB of STATUS4 is 1, the subroutine RTCANCM is called at Step #621. In the subroutine RTCANCM as shown in FIG. 16O, the flag of interval timer operating state is reset at Step #391, and the flag of interval timer time setting state is reset at Step #392. Then, the flag of interval timer having counted down within 10 seconds is reset at Step #393. The control returns to Step #622.

At Step #622, the display after the interval timer was canceled is changed into the PA mode timer lapse display. Since the display is changed, the display change request flag is set at Step #623. At Step #624, the above-described subroutine MDCLR is called to clear the display area, and the CPU 1 exits the subroutine LAMPON. If it is detected at Step #620 that MSB of STATUS4 is 0, that is, that the data imprinting mode is not PA mode, the subroutine RTCANCL is called at Step #640 to cancel the interval timer mode. In the subroutine RTCANCL as shown in FIG. 16O, STATUS is returned to the data imprinting information display in normal mode by resetting MSB of STATUS0 at Step #381. At this point, if the interval timer mode or PA mode were recovered to set MSB in STATUS0, the values in the 3 lower-order bits would not be changed. If the interval timer mode or PA mode were canceled to reset MSB of STATUS0, therefore, the state (display) in interval timer mode or PA mode, which had been provided before the interval timer mode or PA mode was set, could be recovered by checking the values in the 3 lower-order bits. The subroutine RTCANCL is thus designed. The subroutine RTCANCL then jumps to the subroutine RTCANCM where each STATUS flag in interval timer mode is reset, as described above.

The CPU 1 exits the subroutine LAMPON and enters HALT state.

Here, the SiOiNT interrupt process will be described below with reference to FIG. 16L. If the lamp lighting signal is not detected at Step #504, the PIM port is set to "H" or "L" at Step #506 or #507 respectively according to the state of bit 2 in SiO2 detected at Step #505. At Step #508, the state of bit 1 in SiO2 is detected, and the process depends upon the state of the main switch 53 on the camera body. If the main switch 53 is set to ON, it is determined at Steps #509 and #510 whether STATUS is or is not in interval timer operating state and in a waiting state to receive a main switch state signal (in serial code) from the camera body. If STATUS is in the waiting state, the low-order and high-order second digits on the timer counter are cleared to zero (0) at Step #511, the waiting state of STATUS is reset at Step #512, and the interval timer is set into interval timer operating state so that the interval timer can start counting down from the next 32 Hz interrupt. To inform the camera body of the waiting state end, the subroutine iNTSTP is called at Step #514 to set iNT port=L. Then, the CPU 1 enters HALT state.

Figure 16Q:
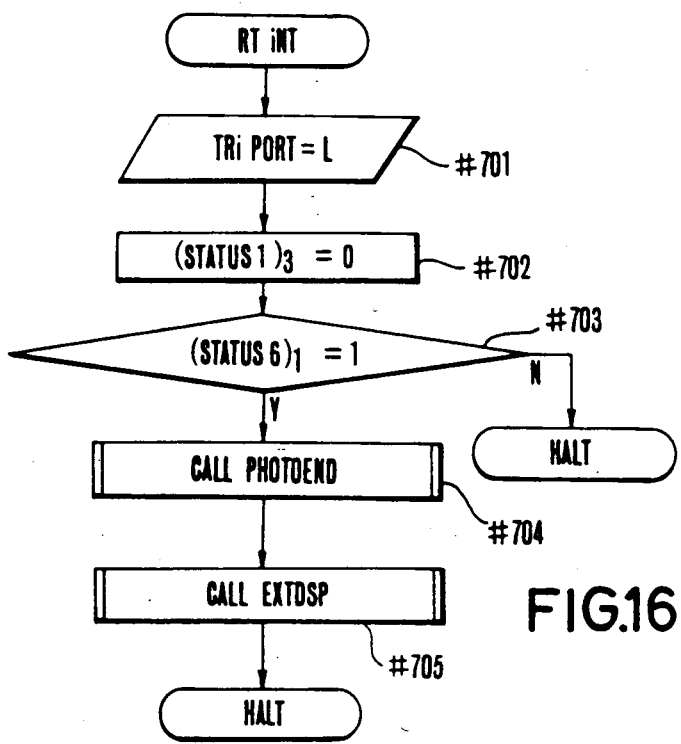
Figure 16R:
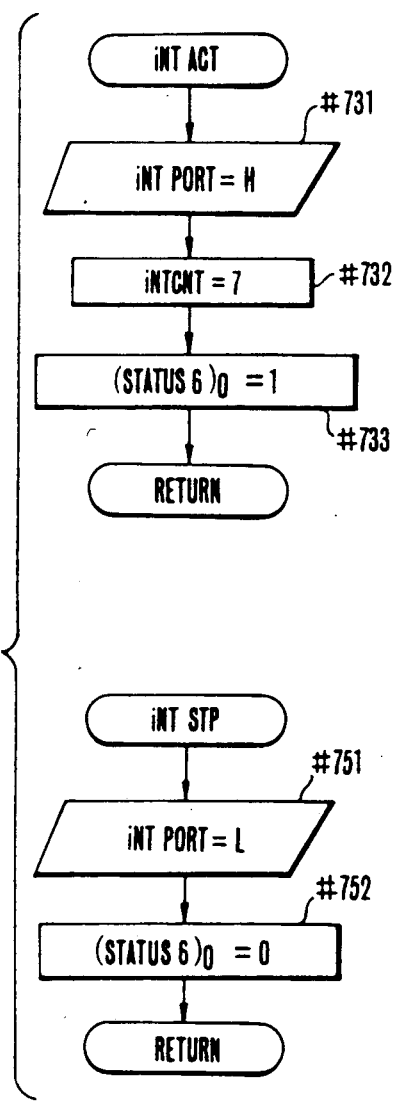

In the subroutine iNTSTP, as shown in FIG. 16R, the I/O port 17 delivers iNT port=L at Step #751, and the iNT port active flag is reset at Step #752.

If it is detected at Step #508 that the main switch 53 is in OFF, it is checked at Step #515 if the interval timer is operating. If it is operating, the interval timer cancel process is divided into two courses according to the data imprinting mode which is PA mode or not; Steps #516, #517, #518, #519 and #520 and Steps #516 and #530, as Steps #620, #621, #622, #623 and #624 and Steps #620 and #640 in the above-described subroutine LAMPON as shown in FIG. 16M. After the interval timer cancel process has been completed, the CPU 1 enters HALT state.

Next, the timer interrupt process (RTiNT) required on the TRi timer counting up will be described with reference to FIG. 16Q.

If the timer interrupt occurs, the CPU 1 starts the operation from Step #701. At Step #701, TRi port=L is set to turn off the lamp. At Step #702, STATUS of TRi port=H output state is cleared. It is then determined at STEP #703 whether the interval timer time has been counted down within 10 seconds or not. If the time left is not within 10 seconds, the RTiNT process is completed to set the CUP 1 to HALT state. If it is detected at Step #703 that the interval timer time has been counted down within 10 seconds, the subroutine PHOTOEND is called at Step #704 to prepare for the next counting cycle of the interval timer. The subroutine PHOTOEND is as described in the SiOiNT process. At Step #705, the subroutine EXTDSP is called to process the displays other than the data imprinting information display in normal mode. The subroutine EXTDSP is as described above. Then, the sequence is set to HALT state.

Here, how to monitor the state of the main switch 53 on the camera body on the startup of the interval timer will be described below.

Figure 17:
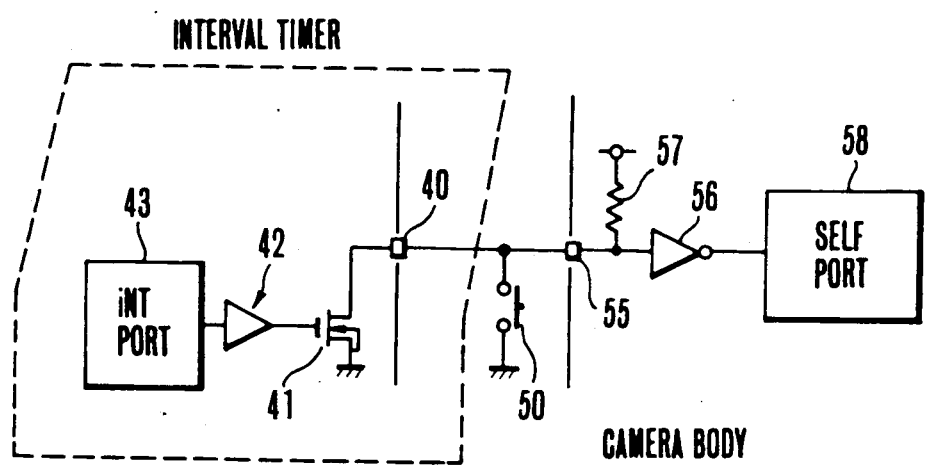
FIG. 17 is a circuit diagram showing the interconnection between the interval timer and the camera body.
Figure 18:
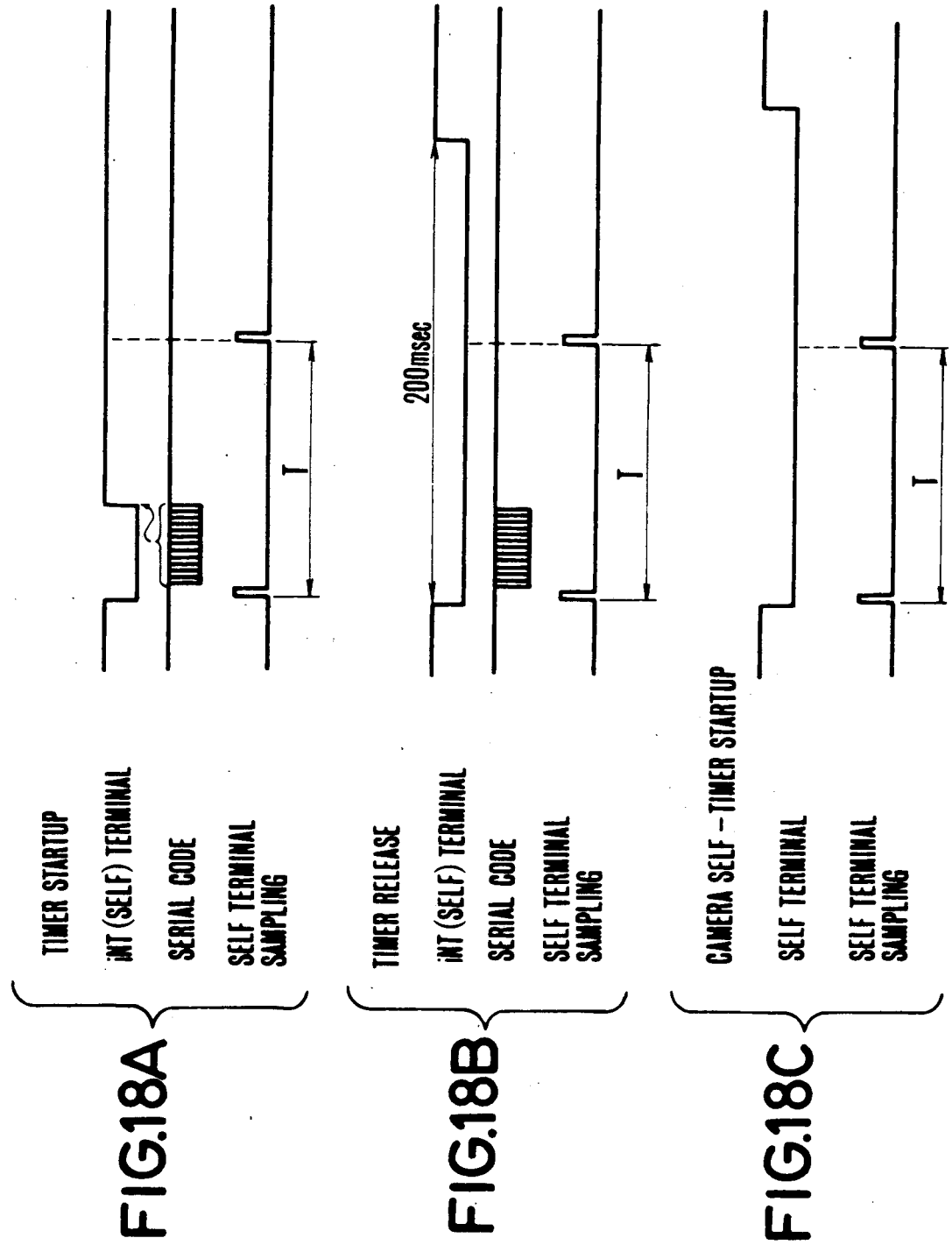
FIGS. 18A to 18C are timing charts showing the timer operation.

During the interval timer operation, the camera is released by the self-timer start up. Therefore, the camera control circuit is required to identify (i) the timer startup signal, (ii) the timer release signal and (iii) the self-timer startup by a self-switch. FIG. 17 shows the circuit configuration of the connection between the iNT port terminal of the interval timer and the SELF terminal of the camera control circuit in this embodiment according to the present invention. In this figure, the configuration of the interval timer control circuit is shown in the box defined by a broken line on the left side, while the configuration of the camera control circuit is shown on the right side.

In this figure, 40 is an iNT terminal in the interval timer control circuit 43, which is described hereinafter. Reference numeral 41 is an N-channel MOS transistor, which is the same as shown by reference numeral 18 in FIG. 3. Reference numeral 42 is an iNT signal output buffer, 43 is an interval timer control circuit which contains the above-described microcomputer, 50 is a self-timer switch on the camera, 55 is a SELF terminal in a camera control circuit, 56 is a SELF signal input inverter, 57 is a resistor which pulls up the input to the inverter 56, and 58 is a camera control circuit.

Now, the signal timings will be described by referring to the timing charts, FIGS. 18A to 18C. If the self-timer is started up by means of the self-timer switch 50, the input to the inverter 56, which has been pulled up by the pull-up resistor 57, is set to L level when the self-timer switch 50 is turned on, as shown in the timing chart, FIG. 18C. The camera control circuit 58 is designed so that it can sample the SELF terminal 55 at the predetermined period of timer (T), for example, that the self-timer is started up when 2 or more L levels are detected. The camera control circuit 58 is also designed so that it can transfer the serial code containing the main switch state signal to the interval timer through the above-described serial interface circuit 19 when it samples and detects the first L level of the SELF terminal. Therefore, the self timer on the camera can be started up by pressing the self-timer switch 50 for a longer time than the sampling period (T).

As it is shown in the timing chart, FIG. 18A, when the interval timer is started up, the interval timer control circuit 43 sets the MOS transistor 41 to ON to set the SELF terminal 55 to L level, and the camera control circuit 58 then detects L level of the SELF terminal 55 for the first timer by sampling and delivers the main switch state signal in serial code. The interval timer control circuit 43 receives this state signal and sets the iNT port to L level at the same time. If this setting of the iNT port to L (SELF terminal=H) occurs before the second sampling of the SELF terminal, the self-timer on the camera body will not start up. Since the interval time control circuit 43 side has received the state signal of the main switch 53 in serial code, it can determine whether the interval timer is to be started or not, by checking the serial code. The checking process is as described in the explanation on SiOiNT as shown in FIG. 16L.

Finally, if the interval timer counts up to start the self-timer, the interval timer control circuit 43 does not set the iNT port to H according to the serial code input, but keeps it on "L" level for the predetermined timer (200 msec in this embodiment), unlike the above-described starting, as shown in the timing chart FIG. 18B, and can start up the self-timer when the 2 "L" levels of the SELF terminal are detected. It is understood that the sampling period (T) for the SELF terminal in the camera control circuit 58 is sufficiently shorter than 200 msec.

In this embodiment, the interval timer mode is canceled if the main switch 53 on the camera body is in OFF. However, the timer time may be reset in interval timer mode.

Alternatively, this embodiment may be designed so that a warning display can be provided if the main switch 53 on the camera body is to OFF when the interval timer is started, or if the main switch 53 on the camera body is set to OFF during the operation of the interval timer.

Another embodiment of the present invention will be described below.

Figure 19:
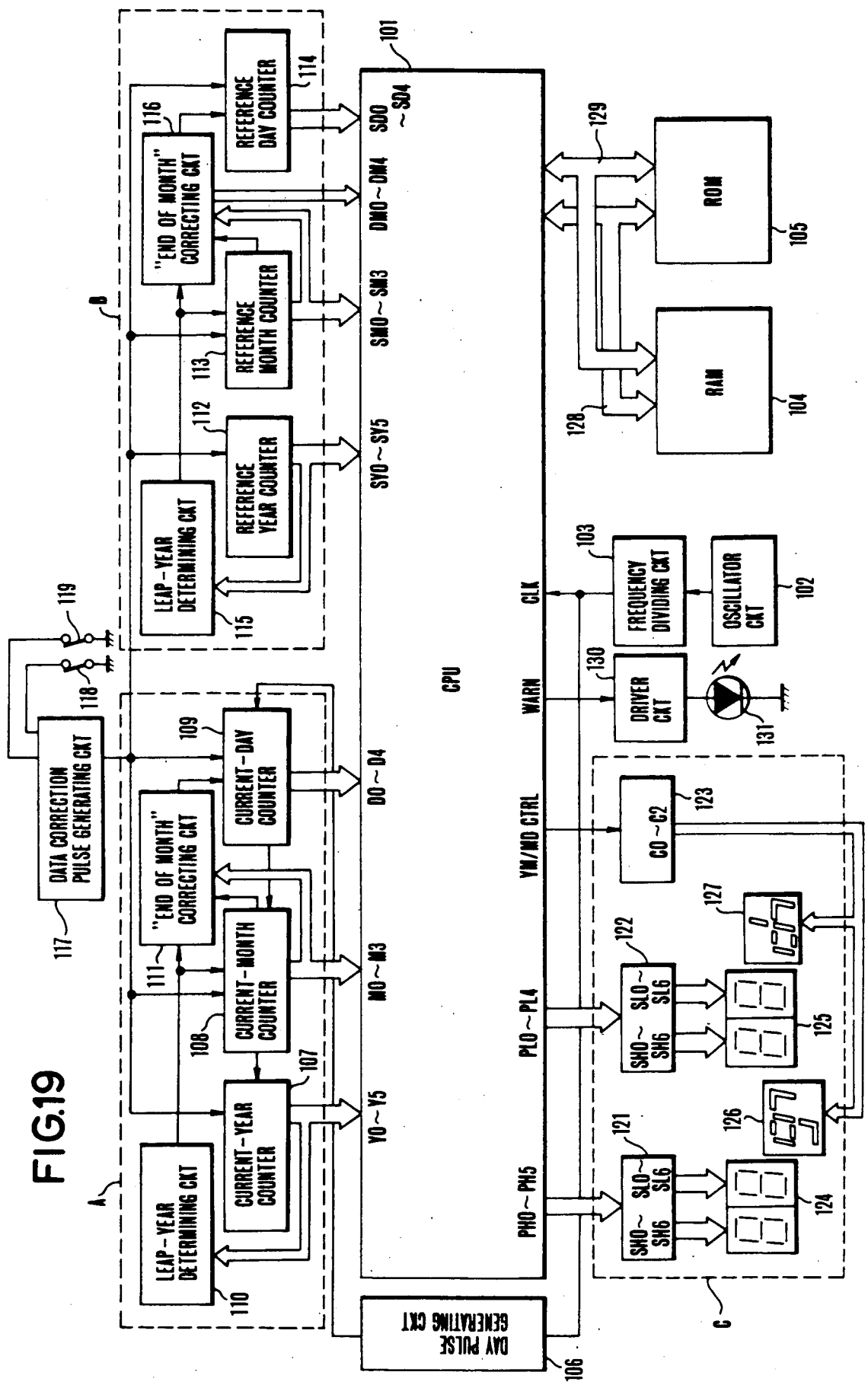
FIG. 19 is a block diagram showing the circuit configuration of a time lapse calculator illustrating another embodiment of the present invention.

FIG. 19 is a block diagram showing the circuit configuration of another embodiment unit according to the present invention, comprising a data imprinting capability mounted on the camera, as in the above-described embodiment.

In FIG. 19, reference numeral 101 is a central processing unit (hereinafter referred to as CPU) which calculates any elapsed time and controls the operating sequence of the circuits as described hereinafter. Reference numeral 102 is an oscillator circuit. Reference numeral 103 is a frequency dividing circuit which divides the output from the oscillator circuit 102 and delivers clock pulses at the predetermined period to the CLK terminal of the CPU 101. Reference numeral 104 is a memory RAM and 105 is a memory ROM. Reference numeral 106 is a day pulse generating circuit which divides the clock pulse output signal from the frequency dividing circuit 103 to produce a day pulse which represents a day.

The memory 104 inputs and outputs data. The memory 105 stores the contents of a program.

In the upper part of FIG. 19, a block A defined by a broken line represents a current-date counter which counts the current date and contains a current-year counter circuit 107, a current-month counter circuit 108, a current-day counter circuit 109, a leap-year determining circuit 110 and an "end of month" correcting circuit 111.

The current-year counter 107 delivers an output corresponding to the 2 lowest-order digits of the current year in the Gregorian calendar to the input ports Y0 to Y5 in the CPU 101.

The current-month counter 108 delivers an output corresponding to the number of the current month (which is represented by any of the numbers 1 to 12 corresponding to Jan. to Dec. respectively) to the input ports M0 to M3 in the CPU 101.

The current-day counter 109 delivers an output corresponding to the current day to the input ports D0 to D4 in the CPU 101.

The leap-year determining circuit 110 is a known circuit which determines whether the output from the current-year counter 107 corresponds to a leap-year or not.

The "end of month" correcting circuit 111 determines whether the output from the current-month counter 108 corresponds to the current month of 31 days or 30 days and whether the output from the current-year counter 110 corresponds to the leap-year or not if the current month is determined as February (containing 29 days in a leap-year or 28 days in any other year), and delivers an "end of month" correcting signal to the current-day counter 109.

In the upper and right part of FIG. 19, a block B represents a reference date setting counter which sets the reference date for the calculation of elapsed time. This counter contains a reference year counter 112, a reference month counter 113, a reference day counter 114, a leap-year determining circuit 115 and an "end of month" correcting circuit 116.

The reference year counter 112 counts years in the Gregorian calendar, the reference month counter 113 counts months, and the reference day counter 114 counts days. The reference year counter 112 delivers the output to the input ports SY0 to SY5 in the CPU 101. The reference month counter 113 delivers the output to the input ports SM0 to SM3 in the CPU 101. The reference day counter 114 delivers the output to the input ports SD0 to SD4 in the CPU 101. The "end of month" correcting circuit 116 delivers the output to the input ports DM0 to DM4 in the CPU 101.

The "end of month" correcting circuit 116 produces an "end of month" correction signal which commands the CPU 101 to correct the day count from the reference day counter 114 as well as the 5-bit information of the days in the reference month, and delivers the signal and the 5-bit information to the input ports DM0 to DM4 in the CPU 101.

The current-year counter 107, the current-month counter 108, the current-day counter 109, the reference year counter 112, the reference month counter 113 and the reference day counter 114 are arranged to be controlled by the data correction pulse signal produced by a data correction pulse generating circuit 117. This circuit 117 selects one of the above 6 counters when a switch 118 connected to the circuit 117 is closed, and applies a correction increment pulse to the selected counter when a switch 119 connected to the circuit 117 is closed.

In the lower and left part of FIG. 19, a block C represents a display means which displays a lapse of time from any reference time to the current time in addition to the other data. The display means contains decoders 121 to 123 and display sections 124 to 127. The decoder 121 decodes the high-order two digits of the time lapse data produced by the output ports PH0 to PH5 in the CPU 101, and delivers its output to a driving element to drive 2 display elements of 7 segments each in the high-order digit display section 124. The decoder 122 decodes the low-order two digits of the time lapse data produced by the output ports PL0 to PL4 in the CPU 101, and delivers its output to a driving element to drive 2 display elements of 7 segments each in the low-order digit display section 125. Therefore, the decoders 121 and 122 have 7 output ports SH0 to SH6 and SL0 to SL6 respectively for each display element in the display sections 124 and 125, respectively.

The decoder 123 produces the driving outputs corresponding to the units (year, month and day) for any elapsed period of time, and delivers them to the unit display sections 126 and 127. This decoder 123 decodes the output signal produced by the output port YM/MD CTRL in the CPU 101, and delivers through two output ports C0 to C2 the output to a driving element to drive the display element of segments corresponding to the high-order data (y or m, that is, year or month respectively) as well as the output to a driving element to drive the display element of segments corresponding to the low-order data (m or d, that is, month or day).

Reference numeral 130 is a driver circuit which drives an LED 131 which displays a warning according to the output from an output port WARN in the CPU 101, if the reference date is set on or after the current date.

FIG. 20 is a table listing the port addresses and their contents in every input or output port in the CPU 101 with reference to every memory address.

FIG. 21 is a table listing the outputs (DM outputs) of the "end of month" correcting circuit according to the reference year and the reference month.

Figure 22:
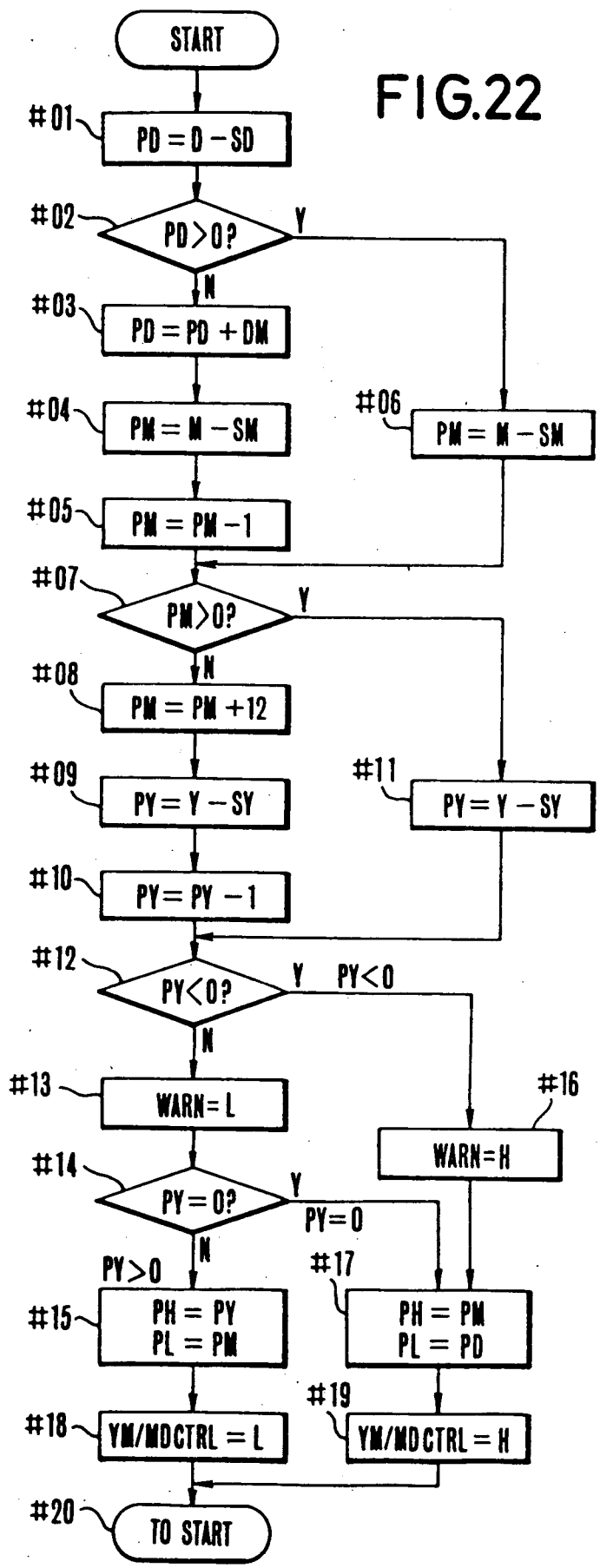
FIG. 22 is a flowchart showing a program run in the CPU 101 as shown in FIG. 19.

FIG. 22 is a flow chart showing a program run in the CPU 101.

Figure 23:
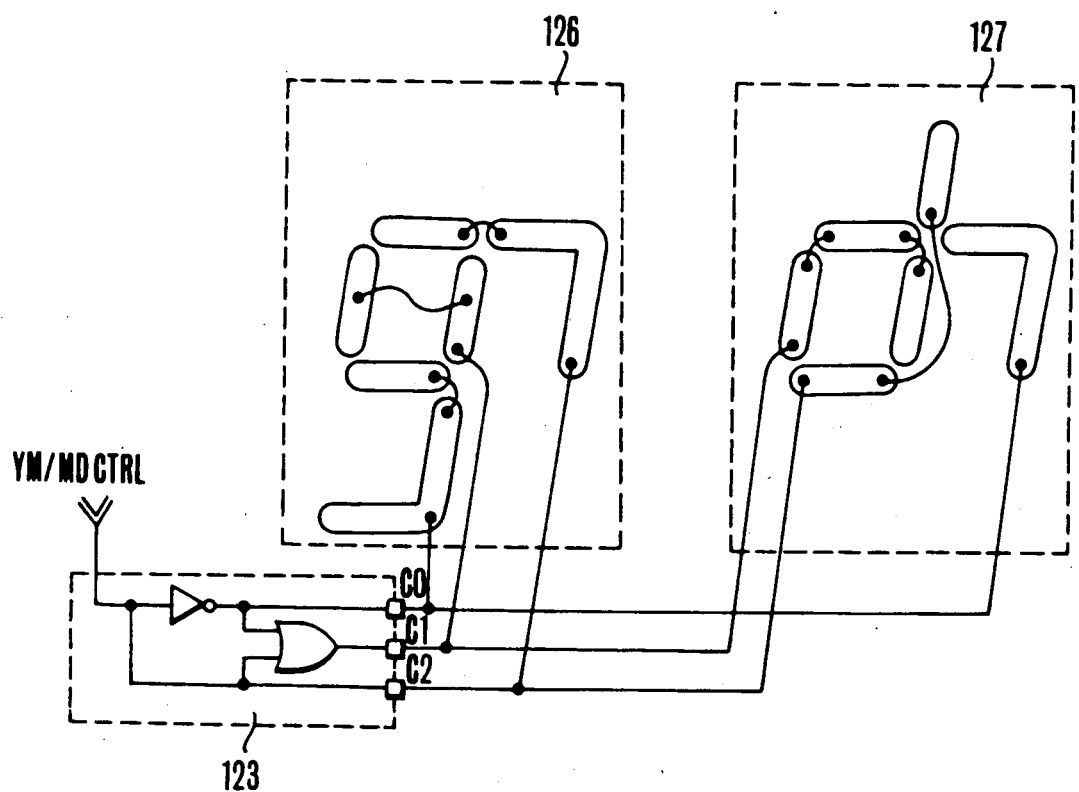
FIG. 23 is a schematic view showing the configuration of a decoder 123 and unit display sections 126 and 127 contained in a block C as shown in FIG. 19.

FIG. 23 is a schematic view showing the configuration of the decoder 123, the layout of segments in the unit display sections 126 and 127, and the electrical connections of the segments with the decoder 123.

The contents of the current-year counter 107, the current-month counter 108 and the current-day counter 109 as well as the contents of the reference year counter 122, the reference month counter 113 and the reference day counter 114 are stored in the memory 104 through the corresponding input ports in the CPU 101, while the contents of the memory 104 are entered in the decoders 121 and 122 through the output ports PH0 to PH5 and PL0 to PL5, respectively.

The operation of the unit which is an embodiment of the present invention will be described below by referring to FIGS. 19 to 23.

When a power switch (not shown) is turned on, the CPU 101 is operated to run a program as shown in the flow chart in FIG. 22.

In FIG. 22, the CPU 101 starts to run the program from Step #01. Particularly, the CPU 101 calculates the number of passed days (PD) by subtracting the reference day (SD) from the current day stored in the memory 104 or the output from the current-day counter 109. At Step #02, the value (PD) is checked for positive or negative. If the value (PD) is positive, the number of passed months (PM) is determined at Step #06 by subtracting the output (SM) of the reference month counter 113 from the output (M) of the current-month counter 108. Then, the control proceeds to Step #07.

If the value (PD) is determined as negative at Step #02, the control proceeds to Step #03 where the number of days (DM) in the reference month ("29" as the number of days if the reference day is in a leap-year) is added to the calculated number of passed days (PD). Then, at Step #04, the number of passed months (PM) is calculated by subtracting the reference month (SM) from the current month (M). At Step #05, the number of passed month (PM) is reduced by 1 to offset the number of days (DM) in the reference month added to the number of passed days (PD). Then, the control proceeds to Step #07.

At Step #07, the number of passed months (PM) is checked for positive or negative. If the value (PM) is positive, the control proceeds to Step #11 where the number of passed years (PY) is calculated by subtracting the reference year (SY) from the current year (Y), and then to Step #12.

If the number of passed months (PM) is determined as negative at Step #07, the control proceeds to Step #08 where the number of passed months (PM) is incremented by 12, and to Step #09. On Step #09, as at Step #11, the number of passed years (PY) is calculated by subtracting the reference year (SY) from the current year (Y). At Step #10, as at Step #05, the number of passed years (PY) is reduced by 1. Then, the control proceeds to Step #12.

At Step #12, it is determined whether the number of passed years (PY) calculated at Step #10 or Step #11 is negative or not. If it is not negative, it means that the setting of the reference date is correct. At Step #13, the output of the output port WARN is kept on L level. At Step #14, it is checked if (PY)=0 or not. If (PY)=0, the control proceeds to Step #17. If (PY)≠0, the control proceeds to Step #15. At Step #17, the number of passed months (PM) is outputted as the high-order digits (PH) of the time lapse display, while the number of passed days (PD) is outputted as the low-order digits (PL) of the time lapse display. At Step #19, the output of the YM/MD CTRL port in the CPU 101 is set to an "H" (high level). As the results, as shown in FIG. 23, the output terminal C0 of the decoder 123 is set to "L" (Low level), and the two other output terminals C1 and C2 are set to "H" (high level). Consequently, the segments in the unit display section 126 are excited in the form of "m" (month), while the segments in the unit display section 127 are excited in the form of "d" (day). Thus, the elapsed period of time "x months and x days" is displayed in the format of "x m"—"x d".

If the number of passed years is determined as (PY)≠0 at Step #14, the instruction is given at Step #15 that the number of passed years (PY) and the number of passed months (PM) shall be displayed as the high-order digits (PH) and low-order digits (PL) of the time lapse display, respectively. At Step #18, the output level of the YM/MD CTRL port in the CPU 101 is set to "L" (low level). As the results, as shown in FIG. 23, the terminals C0 and C1 of the three output terminals on the decoder 123 are set to "H" (high level) in output level. Consequently, the segments in the unit display section 126 are lighted in the form of "y" (year), while the segments in the unit display section 127 are lighted in the form of "m" (month). Thus, the elapsed period of time "x years and x months" is displayed in the format of "x y"—"x m".

If it is determined at Step #12 that the number of passed years (PY) is negative, it means that the reference date is erroneously set as any date equal to or later than the current date. Then, the control proceeds directly to Step #16 where the output of the output port WARN is set to "H" (high level) to light the LED 131 through the driver circuit 130 in order to inform the user of the camera of the erroneous setting.

Carry-in and carry-out circuits are connected between the current-date counters 107 to 109. In addition, a day pulse produced by the day pulse generating circuit 106 is delivered to the current-day counter 109 every day. Therefore, the current-year counter 107, the current-month counter 108 and the current-day counter 109 are operated as a normal calendar to increment (advance) the current date as the time elapses and consequently to increment (vary) the time lapse display, as well.

FIG. 24 is a flow chart showing a partial modification of the flow chart as shown in FIG. 22, that is, a modification of the embodiment as shown in FIG. 19. In the flow chart in FIG. 22, the LED 131 is lighted to warn that the reference date is erroneously set as any date on or after the current date. In the embodiment as shown in FIG. 24, however, the display "0m 0d" is provided essentially as the warning, if the status "0 month and 0 day" occurs as shown on Step #16' in FIG. 24. This procedure is run at Steps #12, #16', #17 and #19 in this order.

The remaining part of the flow chart in FIG. 24 is similar to that shown in the flow chart in FIG. 22. Therefore, the same step numbers are used for the same steps, and the description of the steps in this part of the flow chart as shown in FIG. 24 are omitted.

In this embodiment, it is understood that the lapsed period of time thus displayed can be imprinted on film as sensitive means, as in the previous embodiment.

What is claimed is:

1. An interval shootable camera comprising:
   (A) timer means for interval photography; and
   (B) stopping means for stopping a time counting operation of said timer means when a shutter release operation is effected during the time counting operation of said timer means.

2. A camera according to claim 1, wherein said timer means comprises means for setting an interval time for the interval photography.

3. An interval shootable camera comprising:
   (A) setting means for setting an interval time for interval photography; and
   (B) control means for controlling a self-timer time to be used as the interval time when an interval shooting operation is started up with the interval time not set by said setting means.

4. A camera according to claim 3, wherein said control means comprises start-up means for starting up self-timer means.

5. An interval shootable camera comprising:
   (A) first timer means for interval photography;
   (B) second timer means for self-timer photography; and
   (C) control means for controlling an interval time for the interval photography by interlocking a time counting operation of said first timer means with a time counting operation of said second timer means.

6. A camera according to claim 5, wherein said control means comprises means for starting the time counting operation of said second timer means in response to the end of the time counting operation of said first timer means.

7. An interval shootable camera comprising:
   (A) setting means for setting an interval time for interval photography;
   (B) start-up means for starting up an operation for the interval photography; and
   (C) display means for displaying the interval time set by said setting means by using hour and minute digits, and displaying, by using a second digit as well as the hour and minute digits, the elapse of the interval time during the operation of the interval photography started up by said start-up means.

8. An interval shootable camera comprising:
   (A) timer means for interval photography; and
   (B) prohibition means for prohibiting said timer means from operating when a main switch of a body of said camera is in an off state.

9. An interval shootable camera comprising:
   (A) timer means for counting an interval time for interval photography; and
   (B) display means for displaying a time counting status of said timer means and a data imprinting display after an operation of the interval photography has been started, wherein said display means does not display the time counting status and the data imprinting display synchronously.

10. A camera according to claim 9, wherein said display means comprises means for displaying the time counting status at the time of the start-up of the operation for the interval photography, and means for switching the display to the data imprinting display.

11. An interval shootable camera comprising:
(A) timer means for interval photography;
(B) data imprinting means for imprinting data on photosensitive means; and
(C) disabling means for disabling an operation of said data imprinting means when a shutter release operation is effected during a time counting operation of said timer means.

12. A camera according to claim 11, wherein said disabling means comprises means for prohibiting the operation of said data imprinting means.

13. An interval photographic device for a camera comprising:
(A) timer means for interval photography; and
(B) stopping means for stopping a time counting operation of said timer means when a shutter release operation is effected during the time counting operation of said timer means.

14. A device according to claim 13, wherein said timer means comprises means for setting an interval time for the interval photography.

15. An interval photographic device for a camera comprising:
(A) setting means for setting an interval time for interval photography; and
(B) control means for controlling a self-timer time to be used as the interval time when an interval shooting operation is started up with the interval time not set by said setting means.

16. A device according to claim 15, wherein said control means comprises start-up means for starting up self-timer means.

17. An interval photographic device for a camera comprising:
(A) first timer means for interval photography;
(B) second timer means for self-timer photography; and
(C) control means for controlling an interval time for the interval photography by interlocking a time counting operation of said first timer means with a time counting operation of said second timer means.

18. A device according to claim 17, wherein said control means comprises means for starting the time counting operation of said second timer means in response to the end of the time counting operation of said first timer means.

19. An interval photographic device for a camera comprising:
(A) setting means for setting an interval time for interval photography;
(B) start-up means for starting up an operation for the interval photography; and
(C) display means for displaying the interval time set by said setting means by using hour and minute digits, and displaying, by using a second digit as well as the hour and minute digits, the elapse of the interval time during the operation of the interval photography started up by said start-up means.

20. An interval photographic device for a camera comprising:
(A) timer means for interval photography; and
(B) prohibition means for prohibiting said timer means from operating when a main switch of a body of said camera is in an off state.

21. An interval photographic device for a camera comprising:
(A) timer means for counting an interval time for interval photography; and
(B) display means for displaying a time counting status of said timer means and a data imprinting display after an operation of the interval photography has been started, wherein said display means does not display the time counting status and the data imprinting display synchronously.

22. A device according to claim 21, wherein said display means comprises means for displaying the time counting status at the time of the start-up of the operation for the interval photography, and means for switching the display to the data imprinting display.

23. An interval photographic device for a camera comprising:
(A) timer means for interval photography;
(B) data imprinting means for imprinting data on photosensitive means; and
(C) disabling means for disabling an operation of said data imprinting means when a shutter release operation is effected during a time counting operation of said timer means.

24. A device according to claim 23, wherein said disabling means comprises means for prohibiting the operation of said data imprinting means.

25. An interval shootable camera comprising:
(A) timer means for counting an interval time for interval photography; and
(B) display means for displaying a time counting status of said timer means and a data recording display after an operation of the interval photography has been started,
wherein said display means does not display the time counting status and the data recording display synchronously.

26. A camera according to claim 25, wherein said display means comprises means for displaying the time counting status at the time of the start-up of the operation for the interval photography, and means for switching the display to the data recording display.

27. An interval shootable camera comprising:
(A) timer means for interval photography;
(B) data recording means for recording data on image recording means; and
(C) disabling means for disabling an operation of said data recording means when a shutter release operation is effected during a time counting operation of said timer means.

28. A camera according to claim 27, wherein said disabling means comprises means for prohibiting the operation of said data recording means.

29. An interval photographic device for a camera comprising:
(A) timer means for counting an interval time for interval photography; and
(B) display means for displaying a time counting status of said timer means and a data recording display after an operation of the interval photography has been started,
wherein said display means does not display the time counting status and the data recording display synchronously.

30. A device according to claim 29, wherein said display means comprises means for displaying the time counting status at the time of the start-up of the operation for the interval photography, and means for switching the display to the data recording display.

31. An interval photographic device for a camera comprising:
(A) timer means for interval photography;
(B) data recording means for recording data on image recording means; and
(C) disabling means for disabling an operation of said data recording means for disabling an operation of said data recording means when a shutter release operation is effected during a time counting operation of said timer means.

32. A device according to claim 31, wherein said disabling means comprises means for prohibiting the operation of said data recording means.

* * * * *

UNITED STATES PATENT AND TRADEMARK OFFICE
CERTIFICATE OF CORRECTION

PATENT NO. : 5,040,006
DATED : August 13, 1991
INVENTOR(S) : Koihi MATSUMURA, et al.

It is certified that error appears in the above-identified patent and that said Letters Patent is hereby corrected as shown below:

IN THE DRAWINGS:
IN THE FIGURES:

Sheet 22, Figure 16O, "DIGHT" should read --DIGIT--; and
    Sheet 22, Figure 16P, "DIGHT" should read --DIGIT--.

COLUMN 1:
    Line 17, "First" should read --First,--;
    Line 19, "stop-" should read --stop--; and
    Line 42, "have" should read --had--.

COLUMN 2:
    Line 3, "the-display" should read --the display--; and
    Line 26, "photograher's" should read --photographer's--; and
    Line 37, "therfore," should read --therefore,--.

COLUMN 4:
    Line 14, "monitors" should read --monitor--; and
    Line 57, "The" should be deleted.

COLUMN 5:
    Line 43, "interrrupt" should read --interrupt--.

COLUMN 6:
    Line 56, "any more." should read --anymore.--; and
    Line 65, "on countdown-displaying" should read --displays--.

COLUMN 8:
    Line 36, "bit 0." should read --bit 0).--; and
    Table 1, "Place" should read --place--.

UNITED STATES PATENT AND TRADEMARK OFFICE
CERTIFICATE OF CORRECTION

PATENT NO. : 5,040,006

DATED : August 13, 1991

INVENTOR(S) : Koihi MATSUMURA, et al.

It is certified that error appears in the above-identified patent and that said Letters Patent is hereby corrected as shown below:

COLUMN 9:
    Table 2-3, "MiNUTES0               --MiNUTE0
         MiNUTES1" should read   MiNUTE1--.

COLUMN 11:
    Line 6, ""mont/day/year"" should read
        --"month/day/year"--.
    Line 11, "$b_2=1$" should read --Bit $b_2=1$--;
    Line 15, "$b_0$" should read --Bit $b_0$--;
    Line 23, "changed." should read --change.--;
    Line 32, "22" should be deleted;
    Line 61, "enters" should read --enter--; and
    Line 68, "counters" should read --counters,--.

COLUMN 12:
    Line 15, "powered on the" should be deleted; and
    Line 54, "2d5" should read --25--.

COLUMN 13:
    Line 19, "on" should read --at--;
    Line 23, "and" should read --are--;
    Line 31, "display" should read --(display--;
    Line 33, "changed." should read --change.--, and "on"
        should read --at--;
    Line 43, "(disply" should read --(display--;
    Line 47, "21 is." should read --21.--;
    Line 55, "in" should be deleted; and
    Line 61, "other modes" should read --modes other--.

UNITED STATES PATENT AND TRADEMARK OFFICE
CERTIFICATE OF CORRECTION

PATENT NO. : 5,040,006
DATED : August 13, 1991
INVENTOR(S) : Koihi MATSUMURA, et al.

Page 3 of 5

It is certified that error appears in the above-identified patent and that said Letters Patent is hereby corrected as shown below:

COLUMN 14:

Line 25, "PA" should read --in the PA--;
Line 28, "on" should read --in--;
Line 44, "On" should read --At--; and
Line 49, "on" should read --at--;

COLUMN 15:

Line 28, "#814" should read --#814,--;
Line 54, "Steps" should read --Step--;
Line 57, "the" should be deleted; and
Line 61, "Steps" should read --Step--.

COLUMN 16:

Line 2, "Steps" should read --Step--;
Line 17, "on" should read --at--;
Line 26, "Steps" (both occurrences) should read --Step--, and "subsequent" should read --subsequent steps--;
Line 27, "subsequent" should read --subsequent steps--;
Line 59, "detemined" should read --determined--;
Line 61, "on" should read --at--; and
Line 66, "and" (first occurrence) should be deleted.

COLUMN 17:

Line 36, "on" should read --at--;
Line 56, "TRESECO=8" should read --TRESECO = 8--;
Line 59, "on" should read --at--; and
Line 60, "TRESEC1" should read --TRSEC1--.

UNITED STATES PATENT AND TRADEMARK OFFICE
CERTIFICATE OF CORRECTION

PATENT NO. : 5,040,006
DATED : August 13, 1991
INVENTOR(S) : Koihi MATSUMURA, et al.

It is certified that error appears in the above-identified patent and that said Letters Patent is hereby corrected as shown below:

COLUMN 18:
    Line 1, "in" should read --to--;
    Line 11, "dSiCNT" should read --SiCNT--;
    Line 17, "on" should read --at--;
    Line 29, "state)" should read --state),--
    Line 33, "the" should read --this--;
    Line 39, "Steps" should read --Step--, and "subsequent"
        should read --subsequent steps--;
    Line 52, "351," should read --#351,--; and
    Line 53, "in" should be deleted.

COLUMN 19:
    Line 13, "Steps" should read --Step--;
    Line 14, "quent." should read --quent steps.--; and
    Line 36, "At first," should read --First,--.

COLUMN 20:
    Line 6, "#507 respectively" should read --#507,
        respectively,--;
    Line 29, "in" should be deleted";
    Line 32, "not;" should read --not:--;
    Line 34, "as" should read --or--; and
    Line 49, "CUP 1" should read --CPU 1--.

COLUMN 21:
    Line 8, "40" should read --reference numeral 40--;
    Line 34, "self timer" should read --self-timer--;
    Line 59, "timer" should read --time--; and
    Line 68, "in" should be deleted.

UNITED STATES PATENT AND TRADEMARK OFFICE
CERTIFICATE OF CORRECTION

PATENT NO. : 5,040,006
DATED : August 13, 1991
INVENTOR(S) : Koihi MATSUMURA, et al.

It is certified that error appears in the above-identified patent and that said Letters Patent is hereby corrected as shown below:

COLUMN 22:
    Line 5, "to" should read --set to--; and
    Line 64, "and" should read --hand--.

COLUMN 24:
    Line 7, "flow chart" should read --flowchart--;
    Line 16, "122," should read --112,--; and
    Line 27, "flow chart" should read --flowchart--;
    Line 47, "month" should read --months--; and
    Line 60, "and" should read --and then--, and "On"
        should read --At--.

COLUMN 25:
    Line 11, "results," should read --result,--;
    Line 29, "decorder" should read --decoder--;
    Line 66, "flow chart" should read --flowchart--; and
    Line 67, "flow chart" should read --flowchart--.

COLUMN 26:
    Line 2, "flow chart" should read --flowchart--.

Signed and Sealed this

Fifteenth Day of March, 1994

BRUCE LEHMAN

Attest:

Attesting Officer

Commissioner of Patents and Trademarks